US008041062B2

(12) United States Patent
Cohen et al.

(10) Patent No.: US 8,041,062 B2
(45) Date of Patent: Oct. 18, 2011

(54) PERSONAL SOUND SYSTEM INCLUDING MULTI-MODE EAR LEVEL MODULE WITH PRIORITY LOGIC

(75) Inventors: Ephram Cohen, San Francisco, CA (US); Nicholas R. Michael, San Francisco, CA (US); Hannes Muesch, San Francisco, CA (US); Caslav Pavlovic, Palo Alto, CA (US); Amad Shamsoddini, Cupertino, CA (US); Chirag Shah, Santa Clara, CA (US)

(73) Assignee: Sound ID, Palo Alto, CA (US)

( * ) Notice: Subject to any disclaimer, the term of this patent is extended or adjusted under 35 U.S.C. 154(b) by 1366 days.

(21) Appl. No.: 11/569,499

(22) PCT Filed: Mar. 28, 2006

(86) PCT No.: PCT/US2006/011309
§ 371 (c)(1), (2), (4) Date: Nov. 21, 2006

(87) PCT Pub. No.: WO2006/105105
PCT Pub. Date: Oct. 5, 2006

(65) Prior Publication Data

US 2007/0255435 A1 Nov. 1, 2007

Related U.S. Application Data

(60) Provisional application No. 60/666,018, filed on Mar. 28, 2005.

(51) Int. Cl.
*H04R 25/00* (2006.01)
*H04M 1/00* (2006.01)

(52) U.S. Cl. ...................... 381/315; 381/328; 455/569.1

(58) Field of Classification Search .................. 381/315, 381/312, 328; 455/575.2, 569.1, 550.1
See application file for complete search history.

(56) References Cited

U.S. PATENT DOCUMENTS 5,721,783 A * 2/1998 Anderson .................... 381/328
6,122,500 A 9/2000 Dent (Continued)

FOREIGN PATENT DOCUMENTS

DE 102 00 796 A1 7/2003

(Continued)

OTHER PUBLICATIONS

Kansal, Aman, "Bluetooth Primer" Internet Citation http://www.holtmann.org/lecture/bluetooth/bt_primer.pdf, retried on Aug. 20, 2004, 30 pages.

(Continued)

*Primary Examiner* — Davetta Goins
*Assistant Examiner* — Phylesha Dabney
(74) *Attorney, Agent, or Firm* — Haynes Beffel & Wolfeld LLP

(57) ABSTRACT

A personal sound system is described that includes a wireless network supporting an ear-level module, a companion module and a phone. Other audio sources are supported as well. A configuration processor configures the ear-level module and the companion module for private communications, and configures the ear-level module for a plurality of signal processing modes, including a hearing aid mode, for a corresponding plurality of sources of audio data. The ear module is configured to handle variant audio sources, and control switching among them.

26 Claims, 29 Drawing Sheets

U.S. PATENT DOCUMENTS

| | | | | |
|---|---|---|---|---|
| 6,230,029 | B1 | 5/2001 | Hahn | |
| 6,560,468 | B1 | 5/2003 | Boesen | |
| 6,684,063 | B2 | 1/2004 | Berger | |
| 6,694,143 | B1 | 2/2004 | Beamish | |
| 6,944,474 | B2 | 9/2005 | Rader | |
| 2002/0071581 | A1 | 6/2002 | Leysieffer | |
| 2002/0197961 | A1 | 12/2002 | Warren | |
| 2003/0045283 | A1 | 3/2003 | Hagedoorn | |
| 2004/0136555 | A1 | 7/2004 | Enzmann | |
| 2004/0157649 | A1 | 8/2004 | Jannard et al. | |
| 2004/0192349 | A1 | 9/2004 | Reilly | |
| 2005/0064915 | A1 | 3/2005 | Lair | |
| 2005/0069161 | A1 | 3/2005 | Kaltenbach | |
| 2005/0078844 | A1 | 4/2005 | Von Ilberg | |
| 2005/0090295 | A1 * | 4/2005 | Ali et al. | 455/575.2 |
| 2005/0096096 | A1 | 5/2005 | Birli | |
| 2005/0100185 | A1 | 5/2005 | Connors | |
| 2005/0124391 | A1 | 6/2005 | Lee | |
| 2005/0202857 | A1 * | 9/2005 | Seshadri et al. | 455/575.2 |
| 2005/0255843 | A1 | 11/2005 | Hilpisch | |
| 2005/0288057 | A1 | 12/2005 | Lai | |
| 2006/0025074 | A1 | 2/2006 | Liang | |

FOREIGN PATENT DOCUMENTS

| | | | |
|---|---|---|---|
| DE | 102 22 408 | A1 | 11/2003 |
| DE | 10222408 | | 11/2003 |
| WO | 01/24576 | A1 | 4/2001 |
| WO | 01/54458 | A2 | 7/2001 |
| WO | WO-0217836 | | 3/2002 |
| WO | WO-03026349 | | 3/2003 |
| WO | 2004/012477 | A2 | 2/2004 |
| WO | 2004/110099 | A2 | 12/2004 |
| WO | WO-2005036922 | | 4/2005 |
| WO | 2005/062766 | A2 | 7/2005 |

OTHER PUBLICATIONS

Supplementary European Search Report from EP famiiy member application mailed May 7, 2009, 10 pages.

* cited by examiner

| | | | | | | | |
|---|---|---|---|---|---|---|---|
| 0:X | 1:X | 2:X | 3:MIC | 4:NR | 5:ANC | 6:FBC | 7:SQ |

PERSONAL SOUND SYSTEM INCLUDING MULTI-MODE EAR LEVEL MODULE WITH PRIORITY LOGIC

CROSS-REFERENCE TO RELATED APPLICATIONS

This application is a filing under 35 USC 371 of PCT/US2006/011309 filed 28 Mar. 2006, now pending, which claims the benefit of U.S. 60/666,018 filed 28 Mar. 2005, now expired.

BACKGROUND OF THE INVENTION

1. Field of the Invention

The present invention relates to personalized sound systems, including an ear level device adapted to be worn on the ear and provide audio processing according to a hearing profile of the user and companion devices that act as sources of audio data.

2. Description of Related Art

Assessing an individual's hearing profile is important in a variety of contexts. For example, individuals with hearing profiles that are outside of a normal range must have their profile recorded for the purposes of prescribing hearing aids which fit the individual profile. U.S. Pat. No. 6,944,474 B2, by Rader et al., describes a mobile phone with audio processing functionality that can be adapted to the hearing profile of the user, addressing many of the problems of the use of mobile phones by hearing impaired persons. See also, International Publication No. WO 01/24576 A1, entitled PRODUCING AND STORING HEARING PROFILES AND CUSTOMIZED AUDIO DATA BASED (sic), by Pluvinage et al., which describes a variety of applications of hearing profile data.

With improved wireless technologies, such as Bluetooth technology, techniques have been developed to couple hearing aids using wireless networks to other devices, for the purpose of programming the hearing aid and for coupling the hearing aid with sources of sound other than the ambient environment. See, for example, International Publication No. WO 2004/110099 A2, entitled HEARING AID WIRELESS NETWORK, by Larsen et al.; International Publication No. WO 01/54458 A2, entitled HEARING AID SYSTEMS, by Eaton et al.; German Laid-open Specification DE 102 22 408 A 1, entitled INTEGRATION OF HEARING SYSTEMS INTO HOUSEHOLD TECHNOLOGY PLATFORMS by Dageforde. In Larsen et al. and Dageforde, for example, the idea is described of coupling a hearing aid by wireless network to a number of sources of sound, such as door bells, mobile phones, televisions, various other household appliances and audio broadcast systems.

One problem associated with these prior art ideas, which incorporate a variety of sound sources into a network with a hearing aid, arises because of the need for significant amounts of data processing resources at each audio source to support participation in the network. So there is a need for techniques to reduce the data processing requirements needed at a sound source for participation in the network. Another problem with prior art systems incorporating a variety of sound sources into a network with a hearing aid arises because the sampling rates, audio processing parameters and processing techniques needed for the various sources of sound are not the same. So simply providing a channel between the hearing aid and variant audio sources is not effective. Furthermore, for diverse personal sound systems, techniques for managing the process of switching from one source to another must be developed.

Thus, technologies for improving the compatibility of hearing aids with mobile phones and other audio sources are needed.

SUMMARY OF THE INVENTION

A personal sound system, and components of a personal sound system are described which address problems associated with providing a plurality of variant sources of sound to a single ear level module, or other single destination. The personal sound system addresses issues concerning the diversity of the audio sources, including diversity in sample rate, diversity in the processing resources at the source, diversity in audio processing techniques applicable to the sound source, and diversity in priority of the sound source for the user. The personal sound system also addresses issues concerning personalizing the ear level module for the user, accounting for a plurality of variant sound sources to be used with the ear module. Furthermore, the personal sound system addresses privacy of the communication links utilized.

A personal sound system is described that includes an ear-level module. The ear-level module includes a radio for transmitting and receiving communication signals encoding audio data, an audio transducer, one or more microphones, a user input and control circuitry. In embodiments of the technology, the ear-level module is configured with hearing aid functionality for processing audio received on one or more of the microphones according to a hearing profile of the user, and playing the processed sound back on the audio transducer. The control circuitry includes logic for communication using the radio with a plurality of sources of audio data in memory storing a set of variables for processing the audio data. Logic on the ear-level module is operable in a plurality of signal processing modes. In one embodiment, the plurality of signal processing modes include a first signal processing mode (e.g. a hearing aid mode) for processing sound picked up by one of the one or more microphones using a first subset of the set of variables and playing the processed sound on the audio transducer. A second signal processing mode (e.g. a companion microphone mode) is included for processing audio data from a corresponding audio source received using the radio according to a second subset of the set of variables, and playing the processed audio data on the audio transducer. A third signal processing mode (e.g. a phone mode) is included for processing audio data from another corresponding audio source, such as a telephone, and received using the radio. The audio data in the third signal processing mode is processed according to a third subset of the set of variables and played on the audio transducer. The ear level module includes logic that controls switching among the first, second and third signal processing modes according to predetermined priority, in response to user input, and in response to control signals from the plurality of sources. Other embodiments include fewer or more processing modes as suits the need of the particular implementation.

An embodiment of the ear-level module is adapted to store first and second link parameters in addition to the set of variables. Logic is provided for communication with a configuration host using the radio. Resources establish a configuration channel with the configuration host and use the channel for retrieving the second link parameter and storing a second link parameter in the memory. Logic on the device establishes a first audio channel using the first link parameter and a second audio channel using the second link parameter. The first link parameter is used for establishment of the configuration channel, for example, and channels with phones or other rich platform devices. The second audio channel established with the second link parameter is used for establishing private communication with thin platform devices such as a companion microphone. In embodiments of the technology, the second link parameter is a private shared secret unique to the pair of devices, and provides a privacy of the audio channel between the ear module and the companion microphone.

A companion module is also described that includes a radio which transmits and receives communication signals. The companion module is also adapted to store at least two link parameters, including the second link parameter mentioned above in connection with the ear-module. The companion module, in an embodiment described herein, comprises a lapel microphone and is adapted for transmitting sound picked up by the lapel microphone using the communication channel to the ear-level module. The companion module can be used for other types of thin platform audio sources as well.

In addition, the companion module and the ear-level module can be delivered as a kit having a second link parameter pre-stored on both devices. In addition, the kit may include a recharging cradle that is adapted to hold both devices.

An embodiment of the ear-level module is also adapted to handle audio data from a plurality of variant sources that have different sampling rates. Thus an embodiment of the invention upconverts audio data received using the radio to a higher sampling rate which matches the sampling rate of data retrieved from the microphone on the ear-level module. This common sampling rate is then utilized by the processing resources on the ear-level module.

A method for configuring the personal sound system is also described. According to the method, a configuration host computer is used to establish a link parameter for connecting the ear-level module with the companion module in the field. The configuration host establishes a radio communication link with the ear-level module, using the public first link parameter, and delivers the second link parameter, along with other necessary network parameters, using a radio communication link to the ear-level module, which then stores the second link parameter in nonvolatile memory. The configuration host also establishes a radio communication link with the companion module using the public link parameter associated with the companion module. Using the radio communication link to the companion module, the configuration host delivers the private second link parameter, along with other necessary network parameters, to the companion module, which then stores it in nonvolatile memory for use in linking with the ear-level module.

An ear module is described herein including an interior lobe housing a speaker and adapted to fit within the cavum conchae of the outer ear, an exterior lobe housing data processing resources, and a compressive member coupled to the interior lobe and providing a holding force between the anti-helix and the forward wall of the ear canal near the tragus. An extension of the interior lobe is adapted to extend into the exterior opening of the ear canal, and includes a forward surface adapted to fit against the forward wall of the ear canal, and a rear surface facing the anti-helix. The width of the extension (in a dimension orthogonal to the forward surface of the extension) between the forward surface and the rear surface from at least the opening of the ear canal to the tip of the extension is substantially less than the width of the ear canal, leaving an open ear passage. The extension fits within the cavum conchae and beneath the tragus, without filling the cavum conchae and leaving a region within the cavum conchae that is in air flow communication with the open ear air passage in the ear canal. The compressive member tends to force the forward surface of the extension against the forward wall of the ear canal, securing the ear module in the ear comfortably and easily.

Other aspects and advantages of the present invention can be seen on review of the drawings, the detailed description and the claims, which follow.

DETAILED DESCRIPTION

A detailed description of embodiments of the present invention is provided with reference to the FIGS. 1-36.

Figure 1:
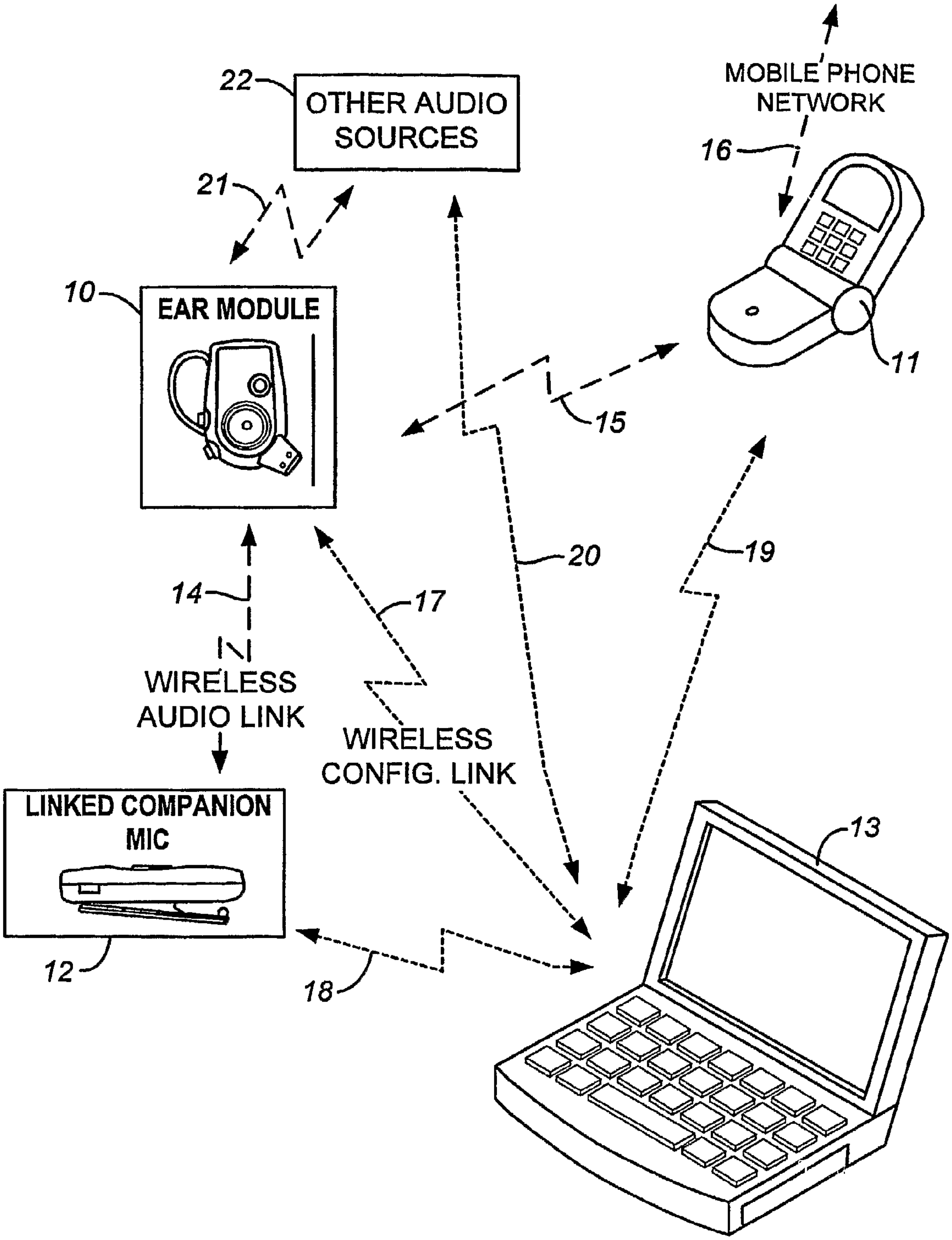
FIG. 1 illustrates a wireless audio network including a multimode ear level module and a plurality of other audio sources, along with a wireless configuration network.

FIG. 1 illustrates a wireless network which extends the capabilities of an ear module 10 (See FIGS. 2A-2B), adapted to be worn at ear level, and operating in multiple modes. The ear module 10 preferably includes a hearing aid mode having hearing aid functionality. The network facilitates techniques for providing personalized sound from a plurality of audio sources such as mobile phones 11, other audio sources 22 such as televisions and radios, and with a linked companion microphone 12 (See FIGS. 3A-3B). In addition, wireless network provides communication channels for configuring the ear module 10 and other audio sources ("companion modules") in the network using a configuration host 13, which comprises a program executed on a computer that includes an interface to the wireless network. In one embodiment described herein, the wireless audio links 14, 15, 21 between the ear module 10 and the linked companion microphone 12, between the ear module 10 and the companion mobile phone 11, and between the ear module 10 and other companion audio sources 22, respectively, are implemented according to Bluetooth compliant synchronous connection-oriented SCO channel protocol (See, for example, Specification of the Bluetooth System, Version 2.0, 4 Nov. 2004). The wireless configuration links 17, 18, 19, 20 between the configuration host 13 and the ear module 10, the mobile phone 11, the linked companion microphone 12, and the other audio sources 22 are implemented using a control channel, such as a modified version of the Bluetooth compliant serial port profile SPP protocol or a combination of the control channel and SCO channels. (See, for example, BLUETOOTH SPECIFICATION, SERIAL PORT PROFILE, Version 1.1, Part K:5, 22 Feb. 2001). Of course, a wide variety of other wireless communication technologies may be applied in alternative embodiments.

Companion modules, such as the companion microphone 12 consist of small components, such as a battery operated module designed to be worn on a lapel, that house "thin" data processing platforms, and therefore do not have the rich user interface needed to support configuration of private network communications to pair with the ear module. For example, thin platforms in this context do not include a keyboard or touch pad practically suitable for the entry of personal identification numbers or other authentication factors, network addresses, and so on. Thus, to establish a private connection pairing with the ear module, the radio is utilized in place of the user interface.

In embodiments of the network described herein, the linked companion microphone 12 and other companion devices may be "permanently" paired with the ear module 10 using the configuration host 13, by storing a shared secret on the ear module and on the companion module that is unique to the pair of modules, and requiring use of the shared secret for establishing a communication link using the radio between them. The configuration host 13 is also utilized for setting variables utilized by the ear module 10 for processing audio data from the various sources. Thus in embodiments described herein, each of the audio sources in communication with the ear module 10 may operate with a different subset of the set of variables stored on the ear module for audio processing, where each different subset is optimized for the particular audio source, and for the hearing profile of the user. The set of variables on the ear module 10 is stored in non-volatile memory on the ear module, and includes for example, indicators for selecting data processing algorithms to be applied and parameters used by data processing algorithms.

Figure 2A:
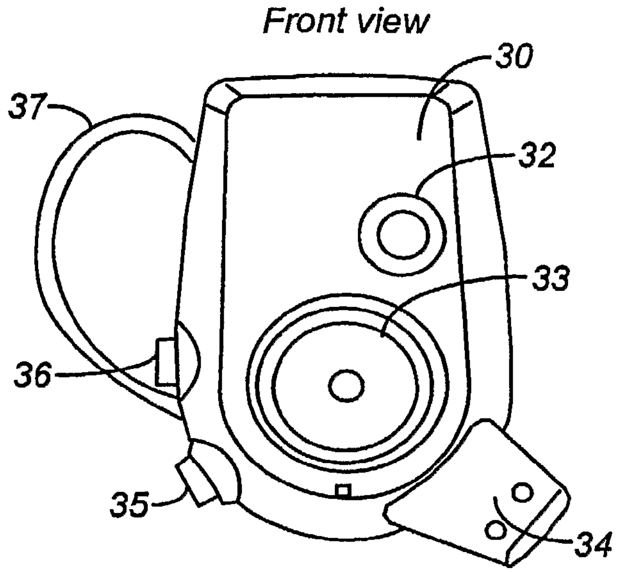
FIGS. 2A and 2B show a front view and a side view of a multimode ear module.
Figure 2B:
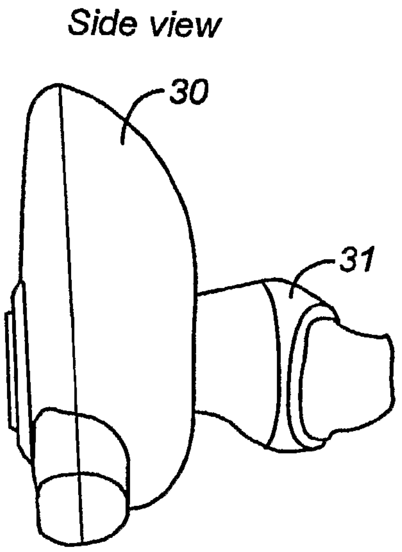

FIG. 2A and FIG. 2B show a front view and a side view of an embodiment of the ear module 10. The ear module 10 includes an exterior lobe 30, containing most of the micro-electronics including a rechargeable battery and a radio, and an interior lobe 31, containing an audio transducer and adapted to fit within the ear canal of the user. FIG. 2A is a front view of the exterior lobe 30. The front view of the exterior lobe 30 illustrates the man-machine interface for the ear module 10. Thus, a status light 32, a main button 33, one or more microphones 34, and buttons 35 and 36 are used for various functions, such as up volume and down volume. The one or more microphones 34 include an omnidirectional microphone mainly used for the hearing aid functionality, and a directional microphone utilized when the ear module 10 is operating as a headpiece for a mobile phone or other two-way communication device. The device is adapted to be secured on the ear by placement of a front surface of the interior lobe 31 in contact with the forward wall of the ear canal, and the flexible ear loop 37 in contact with the anti-helix of the user's exterior ear. Thus, an ear module 10 is described herein including an interior lobe 31 housing a speaker and adapted to fit within the cavum conchae of the outer ear, an exterior lobe 30 housing data processing resources, and a compressive member or ear loop 37 coupled to the interior lobe and providing a holding force between the anti-helix and the forward wall of the ear canal near the tragus. An extension of the interior lobe is adapted to extend into the exterior opening of the ear canal, and includes a forward surface adapted to fit against the forward wall of the ear canal, and a rear surface facing the anti-helix. The width of the extension (in a dimension orthogonal to the forward surface of the extension) between the forward surface and the rear surface from at least the opening of the ear canal to the tip of the extension is substantially less than the width of the ear canal, leaving an open air passage. The extension fits within the cavum conchae and beneath the tragus, without filling the cavum conchae and leaving a region within the cavum conchae that is in air flow communication with the open air passage in the ear canal. The compressive member tends to force the forward surface of the extension against the forward wall of the ear canal, securing the ear module in the ear comfortably and easily.

In embodiments of the ear module described herein, the interior lobe is more narrow (in a dimension parallel to the forward surface of the extension) than the cavum conchae at the opening of the ear canal, and extends outwardly to support the exterior lobe of the ear module in a position spaced away from the anti-helix and tragus, so that an opening from outside the ear through the cavum conchae into the open air passage in the ear canal is provided around the exterior and the interior lobes of the ear module, even in embodiments in which the exterior lobe is larger than the opening of the cavum conchae. Embodiments of the compressive member include an opening exposing the region within the cavum conchae that is in air flow communication with the open air passage in the ear canal to outside the ear. The opening in the compressive member, the region in the cavum conchae beneath the compressive member, and the open air passage in the ear canal provide an un-occluded air path from free air into the ear canal.

Figure 3A:
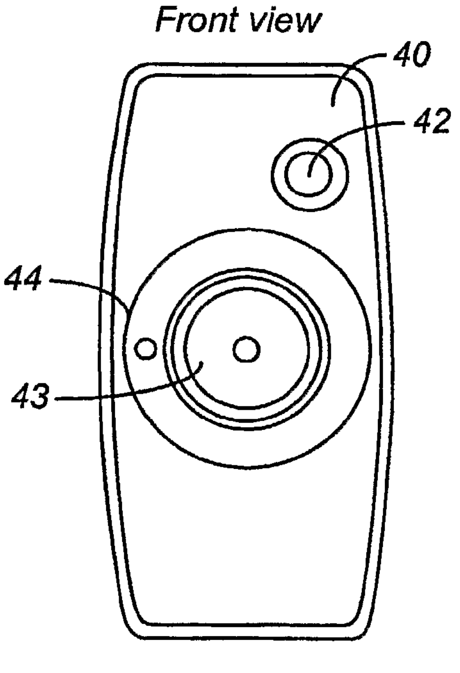
FIGS. 3A and 3B show a front view and a side view of a companion microphone acting as a source of audio signals for the multimode ear module.
Figure 3B:
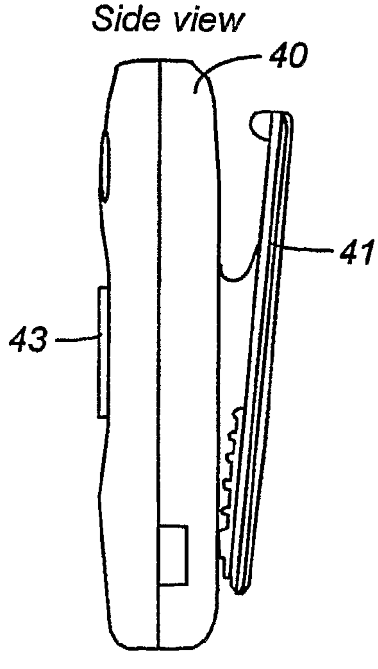

FIG. 3A and FIG. 3B illustrate a front view and a side view of a linked companion microphone, such as the microphone 12 of FIG. 1. The companion microphone includes a main body 40, and a clip 41 in the illustrated embodiment to be worn as a lapel microphone (hence the reference to "LM" in some of the Figures). The main body houses microelectronics including a radio, a rechargeable battery, non-volatile memory and control circuitry, and includes microphone 44 and a man-machine interface as shown in FIG. 3A. The man-machine interface in this example includes a status light 42 and a main button 43.

Figure 4:
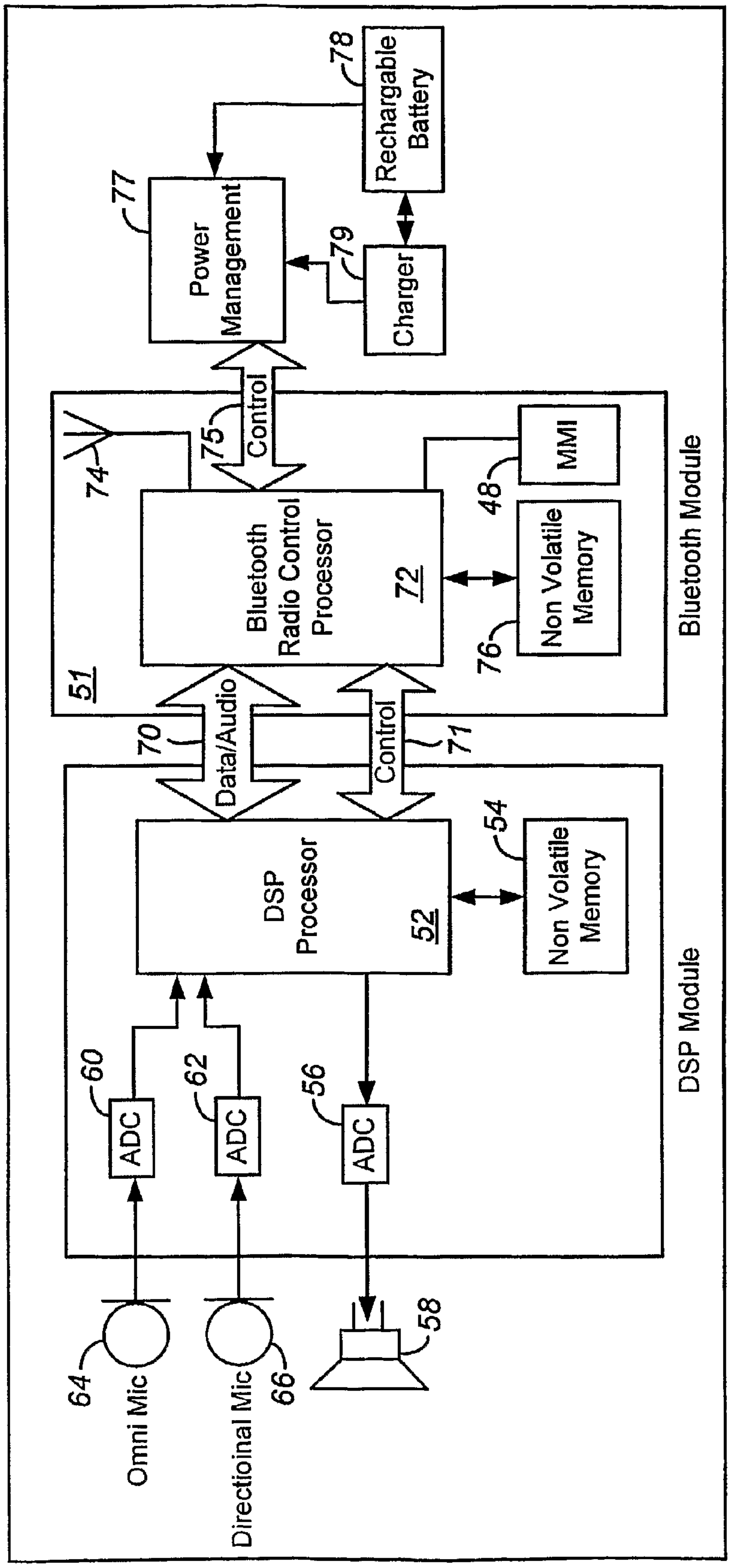
FIG. 4 is a system block diagram of data processing resources in the multimode ear module.

FIG. 4 is a system diagram for microelectronic and audio transducer components of a representative embodiment of the ear module 10. The system includes a data processing module 50 and a radio module 51. The data processing module includes a digital signal processor 52 (hence the reference to "DSP" in some of the Figures) coupled to nonvolatile memory 54. A digital to analog converter 56 converts digital output from the digital signal processor 52 into analog signals for supply to speaker 58 at the tip of the interior lobe of the ear module. A first analog-to-digital converter 60 and a second analog-to-digital converter 62 are coupled to the omnidirectional microphone 64 and a directional microphone 66, respectively, on the exterior lobe of the ear module. The analog-to-digital converters 60, 62 supply digital inputs to the digital signal processor 52. The nonvolatile memory 54 stores computer programs that provide logic for controlling the ear module as described in more detail below. In addition, the nonvolatile memory 54 stores a data structure for a set of variables used by the computer programs for audio processing, where each mode of operation of the ear module may have one or more separate subsets of the set of variables, referred to as "presets" herein.

The radio module 51 is coupled to the digital signal processor 52 by a data/audio bus 70 and a control bus 71. The radio module 51 includes, in this example, a Bluetooth radio/baseband/control processor 72. The processor 72 is coupled to an antenna 74 and to nonvolatile memory 76. The nonvolatile memory 76 stores computer programs for operating a radio 72 and control parameters as known in the art. The processor module 51 also controls the man-machine interface 48 for the ear module 10, including accepting input data from the buttons and providing output data to the status light, according to well-known techniques.

The nonvolatile memory 76 is adapted to store at least first and second link parameters for establishing radio communication links with companion devices, in respective data structure referred to as "pre-pairing slots" in non-volatile memory. In the illustrated embodiment the first and second link parameters comprise authentication factors, such as Bluetooth PIN codes, needed for pairing with companion devices. The first link parameter is preferably stored on the device as manufactured, and known to the user. Thus, it can be used for establishing radio communication with phones and the configuration host or other platforms that provide user input resources to input the PIN code. The second link parameter also comprises an authentication factor, such as a Bluetooth PIN code, and is not pre-stored in embodiment described herein. Rather the second link parameter is computed by the configuration host in the field, for private pairing of a companion module with the ear module. In one preferred embodiment, the second link parameter is unique to the pairing, and not known to the user. In this way, the ear module is able to recognize authenticated companion modules within a network which attempt communication with the ear module, without requiring the user to enter the known first link parameter at the companion module. Embodiments of the technology support a plurality of unique pairing link parameters in addition to the second link parameter, for connection to a plurality of variant sources of audio data using the radio.

In addition, the processing resources in the ear module include resources for establishing a configuration channel with a configuration host for retrieving the second link parameter, for establishing a first audio channel with the first link parameter, and for establishing a second audio channel with the second link parameter, in order to support a variety of audio sources.

Also, the configuration channel and audio channels comprise a plurality of connection protocols in the embodiment described herein. The channels include a control channel protocol, such as a modified SPP as mentioned above, and an audio streaming channel protocol, such as an SCO compliant channel. The data processing resources support role switching on the configuration and audio channels between the control and audio streaming protocols.

In an embodiment of the ear module, the data processing resources include logic supporting an extended API for the Bluetooth SPP profile used as the control channel protocol for the configuration host and for the companion modules, including the following commands:

Echo—echoes the sent string back to the sender.
Pre-Pairing slot read—reads one of the pre-pairing slots.
Pre-Pairing Slot Set—sets one of the pre-pairing slots.
PSKEY set—generic state set. Used for changing Bluetooth address amongst other things.
PSKEY Read—generic state read command. Has access to software version etc.
Battery Read—read battery voltage (in millivolts).
Report more on—turn on special report mode where certain things are reported to the computer without prompting.
MMI Control—control Man Machine Interface remotely.
LED control—set and clear LED's remotely.
PWR Off—for the LM, turn the LM off.
DSP send—send data to the DSP command port.
DSP read—read data from the DSP command port.
Volume Set—set the volume of the EP.
Volume Read—read the current Volume of the EP.
Preset Set—set the "current program" of the EP.
Set Max Preset—set the maximum preset that the device will allow via the MMI.
Pairing off—exit pairing mode.
Mem Status—read the memory pool status.

In addition, certain SPP profile commands are processed in a unique manner by logic in the ear module. For example, an SPP connect command from a pre-paired companion module is interpreted by logic in the ear module as a request to change the mode of operation of the ear module to support audio streaming from the companion module. In this case, the ear module automatically establishes an SCO channel with the companion module, and switches to the companion module mode, if the companion module request is not pre-empted by a higher priority audio source.

In the illustrated embodiment, the data/audio bus 70 transfers pulse code modulated audio signals between the radio module 51 and the processor module 50. The control bus 71 in the illustrated embodiment comprises a serial bus for connecting universal asynchronous receive/transmit UART ports on the radio module 51 and on a processor module 50 for passing control signals.

A power control bus 75 couples the radio module 51 and the processor module 50 to power management circuitry 77. The power management circuitry 77 provides power to the microelectronic components on the ear module in both the processor module 50 and the radio module 51 using a rechargeable battery 78. A battery charger 79 is coupled to the battery 78 and the power management circuitry 77 for recharging the rechargeable battery 78.

The microelectronics and transducers shown in FIG. 4 are adapted to fit within the ear module 10.

The ear module operates in a plurality of modes, including in the illustrated example, a hearing aid mode for listening to conversation or ambient audio, a phone mode supporting a telephone call, and a companion microphone mode for playing audio picked up by the companion microphone which may be worn for example on the lapel of a friend. The signal flow in the device changes depending on which mode is currently in use. A hearing aid mode does not involve a wireless audio connection. The audio signals originate on the ear module itself. The phone mode and companion microphone mode involve audio data transfer using the radio. In the phone mode, audio data is both sent and received through a communication channel between the radio and the phone. In the companion microphone mode, the ear module receives a unidirectional audio data stream from the companion microphone. The control circuitry is adapted to change modes in response to commands exchanged by the radio, and in response to user input, according to priority logic. For example, the system can change from the hearing aid mode to the phone mode and back to the hearing aid mode, the system can change from the hearing aid mode to the companion microphone mode and back to the hearing aid mode. For example, if the system is operating in hearing aid mode, a command from the radio which initiates the companion microphone may be received by the system, signaling a change to the companion microphone mode. In this case, the system loads audio processing variables (including preset parameters and configuration indicators) that are associated with the companion microphone mode. Then, the pulse code modulated data from the radio is received in the processor and up sampled for use by the audio processing system and delivery of audio to the user. At this point, the system is operating in a companion microphone mode. To change out of the companion microphone mode, the system may receive a hearing aid mode command via the serial interface from the radio. In this case, the processor loads audio processing variables associated with the hearing aid mode. At this point, the system is again operating in the hearing aid mode.

If the system is operating in the hearing aid mode and receives a phone mode command from the control bus via the radio, it loads audio processing variables associated with the phone mode. Then, the processor starts processing the pulse code modulated data with an up sampling algorithm for delivery to the audio processing algorithms selected for the phone mode and providing audio to the microphone. The processor also starts processing microphone data with a down sampling algorithm for delivery to the radio and transmission to the phone. At this point, the system is operating in the phone mode. When the system receives a hearing aid mode command, it then loads the hearing aid audio processing variables and returns the hearing aid mode.

Figure 5:
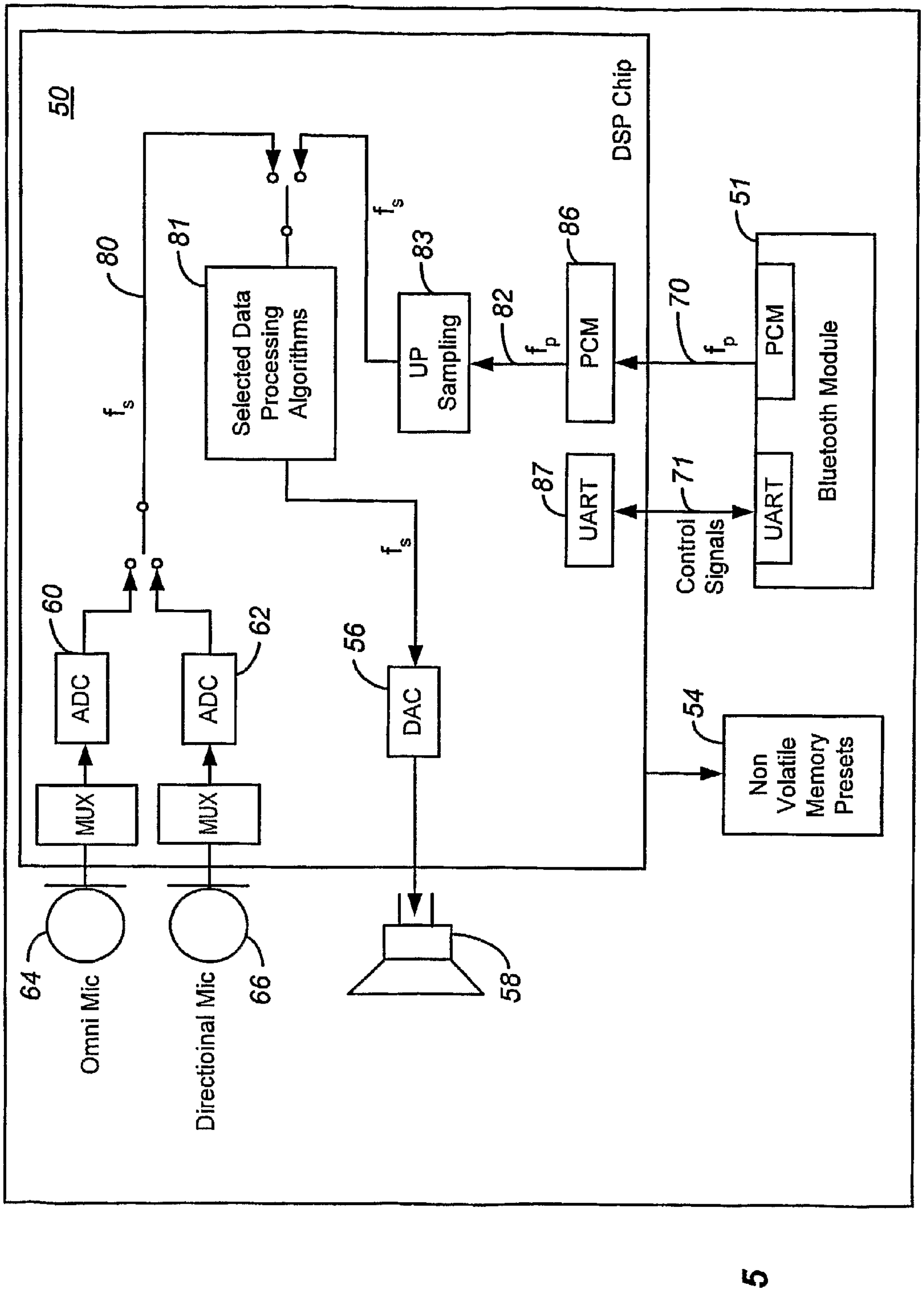
FIG. 5 is a functional block diagram of the multimode ear module configured in a hearing aid mode.

FIG. 5 is a functional diagram of the ear module microelectronics operating in the hearing aid mode. Components in common with corresponding items in FIG. 4 are given the same reference numbers. As mentioned above, the control signals on bus 71 are applied to an UART interface 87 in the processor module 50. Likewise, audio signals are applied from bus 70 to a pulse code modulation interface 86. (Corresponding ports are found in the Bluetooth module 51.) Signals carried from the Bluetooth module at a sampling frequency fp are delivered to an up-sampling program 83 to convert the sampling frequency up to a higher frequency for processing by selected audio processing algorithms 81 executed by the processor module 50. The up sampling is utilized because the selected audio processing algorithms 81 operate on a sampling frequency fs which is different from, and preferably higher than, the sampling frequency fp of the PCM interface 86. The PSS connects to multiple audio devices via Bluetooth in addition to functioning in a stand alone mode as a hearing aid. The audio bandwidth of typical hearing aids is at least 6 KHz. In a digital system this means a sampling frequency of at least 12 KHz is required. The Bluetooth audio in an SCO connection uses an 8 KHz sampling rate. Both the cell phone mode and companion mic mode in the PSS use the SCO connection. When the device switches between hearing aid and one of the "SCO modes", these different data rates have to be reconciled.

One way of dealing with this is to change the sampling rate of the processor device when switching modes. All signal processing would take place at the 12 KHz sampling rate in the hearing aid mode, for example, and at 8 KHz in the other Bluetooth audio modes. The sampling rates of the A/D and D/A would need to be changed along with any associated clock rates and filtering. Most signal processing algorithms would have to be adjusted to account for the new sampling rate. An FFT analysis, for example, would have a different frequency resolution when sampling rate changed.

A preferred alternative to the brute force approach of changing sampling rates with modes is to use a constant sampling rate on the processor and to resample the data sent to and received from the SCO channel. The hearing aid mode runs at a 20 KHz sampling rate for example or other rate suitable for clock and processing resources available. When switching to the phone mode, the microphone is still sampled at 20 KHz, then it is downsampled to 8 KHz and sent out the SCO channel. Similarly, the incoming 8 KHz SCO data is upsampled to 20 KHz and then processed using some of the same signal processing modules used by the hearing aid mode. Since both modes use 20 KHz in the processing phase, there's no need to retool basic algorithms like FFTs and filters for each mode. The companion mic mode uses a unidirectional audio stream coming from the companion mic at 8 KHz. This is upsampled to 20 KHz and processed in the device.

Since the ranges of conversion of sampling rates are related by a simple ratio, 5:2, a polyphase filter structure is used for the upsampling and downsampling. This efficient technique is a well known method for resampling digital signals. Any other resampling technique could be used with the same benefits as listed above.

In the hearing aid mode, the processor 50 receives input data on line 80 from one of the microphones 64, 66 selected by the audio processing variables associated with the hearing aid mode. This data is digitized at a sampling frequency fs, which is preferably higher than a sampling frequency fp used on the pulse code modulated bus for the data received by the radio. The digitized data from the microphone is personalized using selected audio processing algorithms 81 according to a selected set (referred to as a preset and stored in the nonvolatile memory 54) of audio processing variables including verbal and based on a user's personal hearing profile. The processed data is output via the digital to analog converter 56 to speaker 58.

When operating in the hearing aid mode, the processor module 50 may receive input audio data via the PCM interface 86. The data contained in audio signal generated by the Bluetooth module 51 such as an indicator beep to provide for example an audible indicator of user actions such as a volume max change, a change in the preset, an incoming phone call on the telephone, and so on. In this case, the audio data is up sampled using the up sampling algorithm 83 and applied to the selected audio processing algorithms 81 for delivery to the user.

Figure 6:
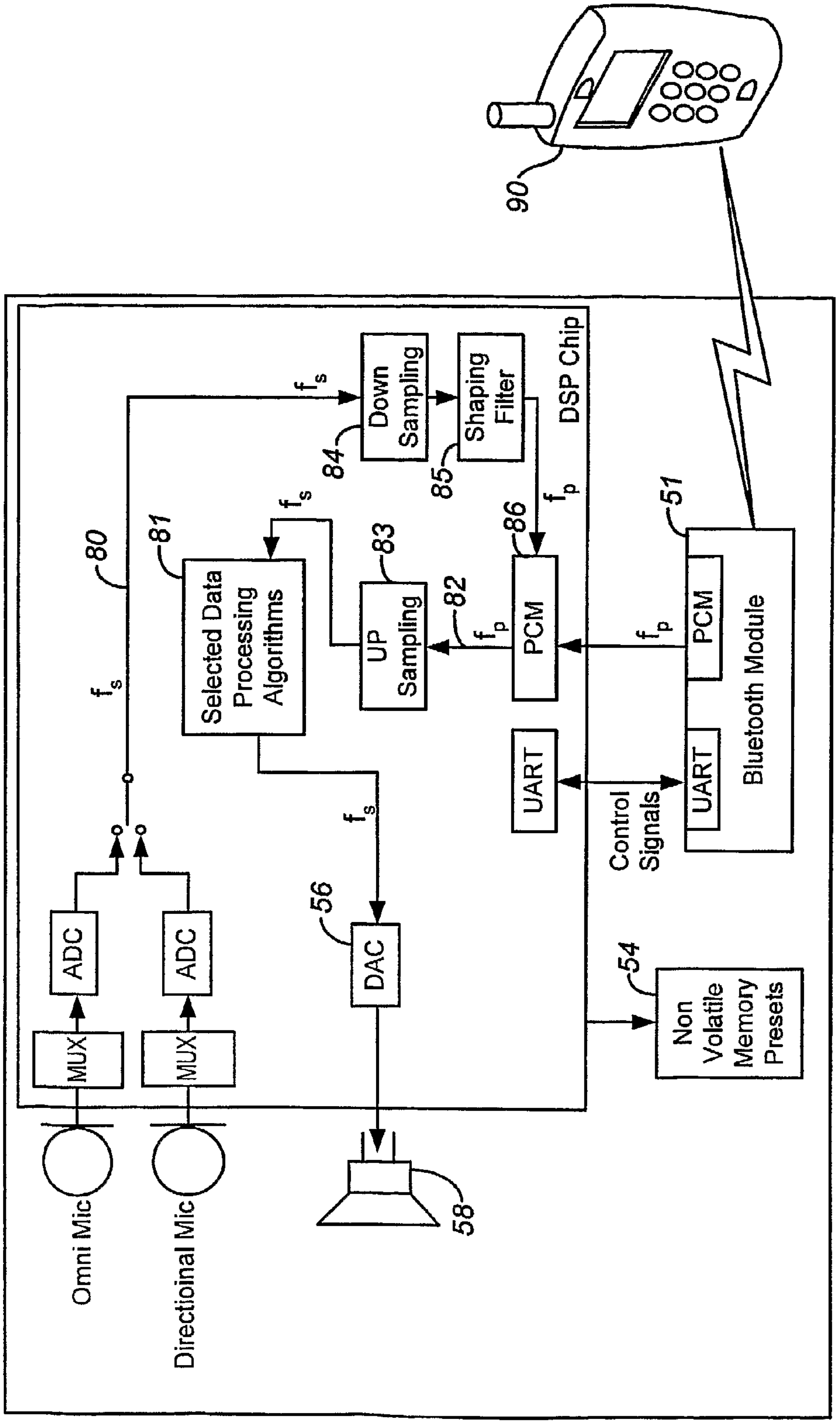
FIG. 6 is a functional block diagram of the multimode ear module configured in a phone mode.

FIG. 6 is a functional diagram of the phone mode, in which a Bluetooth enabled mobile phone 90 has established a wireless communication link with the Bluetooth module 51 on the ear module. In phone mode, incoming audio data from the phone is received at the processor 50 via the PCM interface 86. The processor 50 up samples 83 the audio data and delivers it to selected audio processing algorithms 81. The resulting processed audio data is applied to the digital to analog converter 56 which drives the speaker 58. Data from the microphones on the ear module is received on bus 80 delivered to a down sampling program 84 and a shaping filter 85 in the processor 50. Down sampling is utilized for converting the processed data or unprocessed microphone data at the sampling frequency fs, to the sampling frequency fp utilized at the PCM interface 86. The shaped data from the microphone having a sampling frequency of the PCM interface 86 is delivered to the interface 86 where it is passed to the radio 51 and via the established communication link to the mobile phone 90.

Figure 7:
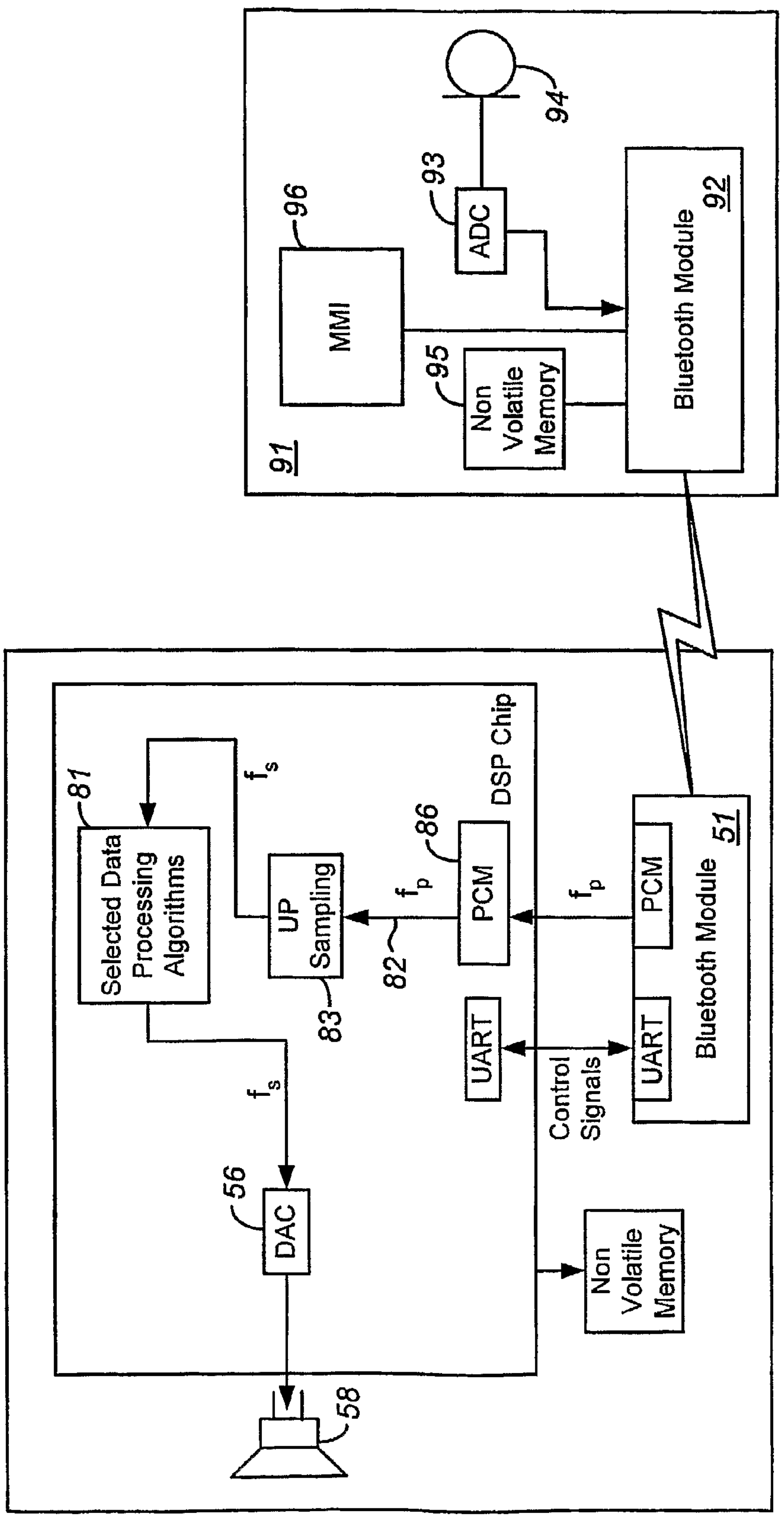
FIG. 7 is a functional block diagram of the multimode ear module configured in a companion microphone mode.

FIG. 7 is a functional diagram of the companion microphone mode, in which the Bluetooth enabled companion microphone 91 has established a wireless communication link with the Bluetooth module 51 on the ear module. In the companion microphone mode, incoming audio data from the companion microphone is received at the processor 50 via the PCM interface 86. The processor 50 up samples 83 the audio data and delivers it to selected audio processing algorithms 81 as determined by the preset selected for the companion microphone mode. The selected audio processing algorithms 81 personalize the audio data for the user and send the data through the digital to analog converter 56 to the speaker 58. The companion module 91 includes a "thin" man-machine interface 96, such as a single button and an LED. The companion module 91 also includes nonvolatile memory 95 for storing network and configuration parameters as described herein.

As illustrated in FIG. 7, the companion microphone module 91 includes a microphone 94 which is coupled to an analog-to-digital converter 93. The analog-to-digital converter 93 is coupled to a Bluetooth module 92 (such as module 51 of FIG. 4), for communication with the corresponding module 51 on an ear module. In the companion microphone, the analog-to-digital converter 93 may be adapted to operate the same sampling frequency as used by the PCM encoding for the Bluetooth communication link, thereby simplifying the processing resources needed on the companion microphone. In alternative embodiments, the companion microphone may include a processor module in addition to the Bluetooth module for more sophisticated audio processing. Likewise, although not shown in the figure, the companion microphone includes a power management circuit coupled to a rechargeable battery and a battery charger interface.

As mentioned above, the ear module applies selected audio processing algorithms and parameters to compensate for the hearing profile of the user differently, depending on the mode in which it is operating.

The selected audio processing algorithms are defined by subsets, referred to herein as presets, of the set of variables stored on the ear module. The presets include parameters for particular audio processing algorithms, as well as indicators selecting audio processing algorithms and other setup configurations, such as whether to use the directional microphone or the omnidirectional microphone in the hearing aid or phone modes. When the ear module is initially powered up, the DSP program and data are loaded from nonvolatile memory into working memory. The data in one embodiment includes up to four presets for each of three modes: Hearing Aid, Phone and Companion microphone. A test mode is also implemented in some embodiments. When a transition from one mode to another occurs, the DSP program in the processor module makes adjustments to use the preset corresponding to the new mode. The user is able to change the preset to be used for a given mode by pressing a button or button combination on the ear module.

In the example described herein, the core audio processing algorithm which is personalized according to a user's hearing profile and provides hearing aid functionality, is multiband Wide Dynamic Range Compression (WDRC) in a representative embodiment. This algorithm adjusts the gain applied to the signal with a set of frequency bands, according to the user's personal hearing profile and other factors such as environmental noise and user preference. The gain adjustment is a function of the power of the input signal.

Figure 8:
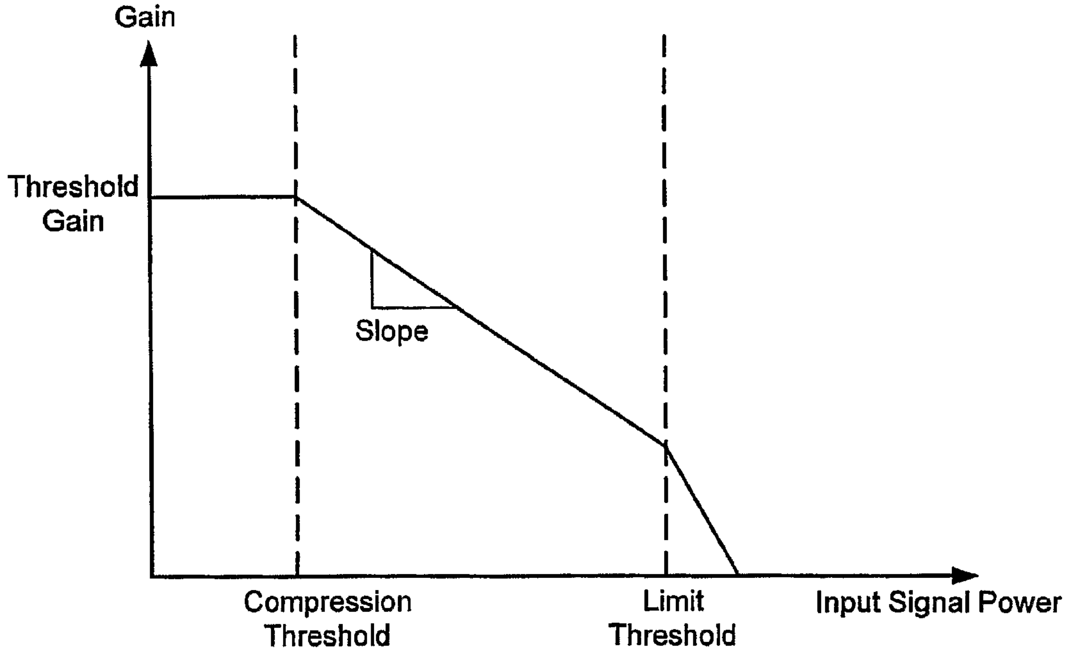
FIG. 8 is a graph illustrating parameters for an audio processing algorithm.

As seen in FIG. 8, four parameters used by the WDRC algorithm determine the relation between gain and input signal power: threshold gain, compression threshold, limit threshold and slope. Additionally, the dynamic behavior of the gain adjustment is controlled by two more parameters, the attack and release time constants. These time constants determine how quickly the gain is adjusted when the power increases or decreases, respectively.

The incoming signal is analyzed using a bank of non-uniform filters and the compression gain is applied to each band individually. A representative embodiment of the ear module uses six bands to analyze the incoming signal and apply gain. The individual bands are combined after the gain adjustments, resulting in a single output.

Figure 9:
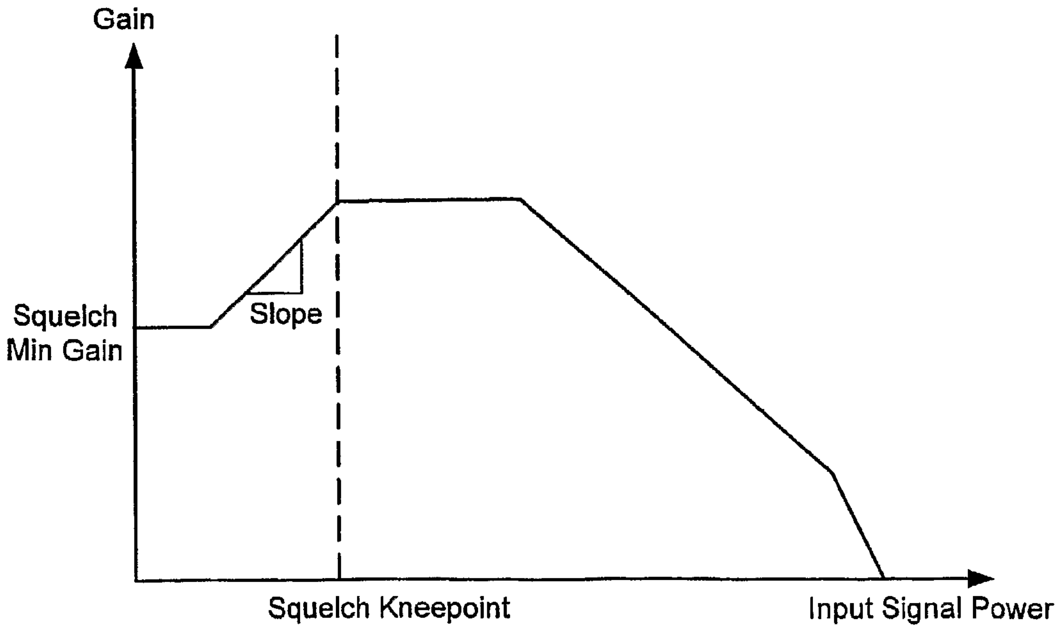
FIG. 9 is a graph illustrating parameters for another audio processing algorithm.

Another audio processing algorithm utilized in embodiments of the ear module is a form of noise reduction known as Squelch. This algorithm is commonly used in conjunction with dynamic range compression as applied to hearing aids to reduce the gain for very low level inputs. Although it is desirable to apply gain to low level speech inputs, there are also low level signals, such as microphone noise or telephone line noise, that should not be amplified at all. The gain characteristic for Squelch is shown in FIG. 9, which also shows the compression gain described above. The parameters shown here are Squelch Kneepoint, Slope and Minimum Gain. Like compression, there are time constants associated with this algorithm that control the dynamic behavior of the gain adjustment. In this case there are two sets of Attack and Release time constants, depending on whether the input signal power is above or below the Squelch Kneepoint. Unlike the multiband implementation of WDRC described above, the Squelch in a representative system operates on one band that contains the whole signal.

In a representative example, the presets for the signal processing algorithms in each mode are stored in the ear module memory 54 in identical data structures. Each data structure contains appropriate variables for the particular mode with which it is associated. There are six entries for the compression parameters because the algorithm operates on the signal in six separate frequency bands. A basic data structure for one preset associated with a mode of operations is as follows:

Program 0 Slope:
  Slope_1
  Slope_2
  Slope_3
  Slope_4
  Slope_5
  Slope_6
Program 0 Gain:
  Gain_1
  Gain_2
  Gain_3
  Gain_4
  Gain_5
  Gain_6
Program 0 Kneepoint:
  Knee_1
  Knee_2
  Knee_3
  Knee_4
  Knee_5
  Knee_6
Program 0 Release Time:
  Release_1
  Release_2
  Release_3
  Release_4
  Release_5
  Release_6
Program 0 Attack Time:
  Attack_1
  Attack_2
  Attack_3
  Attack_4
  Attack_5
  Attack_6
Program 0 Limit Threshold:
  Limit_1
  Limit_2
  Limit_3
  Limit_4
  Limit_5
  Limit_6
Configuration Registers:
  Config_1
  Config_2
Program 0 Squelch Parameters:
  Squelch_Attack_1
  Squelch_Release_1
  Squelch_Attack
  Squelch_Release
  Squelch_Kneepoint
  Squelch_Slope
  Squelch_Minimum_Gain Multiple presets are stored on the ear module, including at least one set for each mode of operation. A variety of data structures may be used for storing presets on the ear module in addition to, or instead of, that just described.

Figures 10, 14:
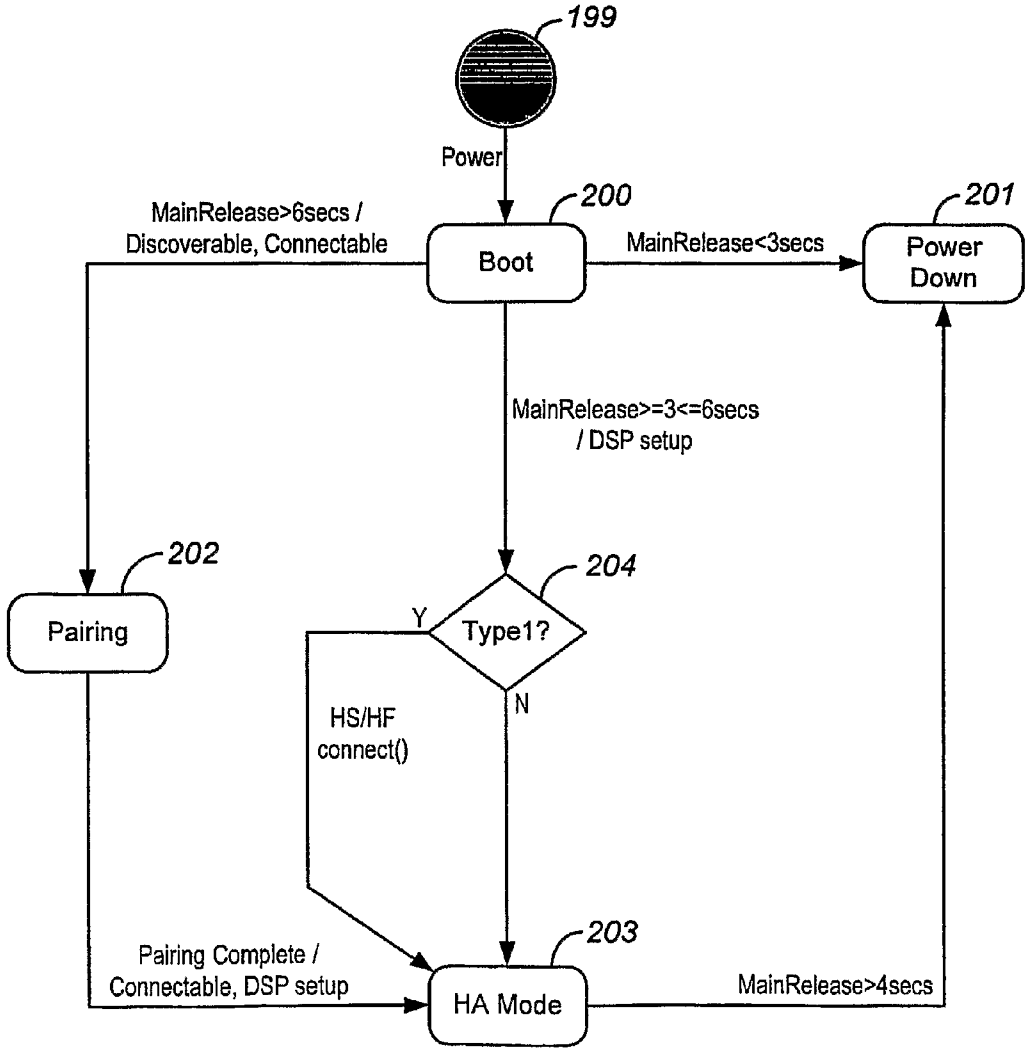
FIG. 10 illustrates a data structure for configuration variables for audio processing resources on a multimode ear module.
FIG. 14 is a state diagram for modes of operation of the ear module related to a power up or setup event.

One of the variables listed above is referred to as the Configuration Register. The values of indicators in the configuration register indicate which combination of algorithms will be used in the corresponding mode and which microphone signal is selected. Each bit in the register signifies an ON/OFF state for the corresponding feature. Every mode has a unique value for its Configuration Register. FIG. 10 shows a representative organization for a configuration register variable, in which it comprises an 8-bit variable (bits 0-7) in which bits 0-2 are reserved, bit 3 indicates the microphone selection, bit 4 indicates whether to use noise reduction algorithm, bit 5 indicates whether to apply ANC, bit 6 indicates whether to apply feedback cancellation and bit 7 indicates whether to apply squelch.

In a representative embodiment, the Compressor and Squelch algorithms are used in all three modes of the system, but parameter values are changed depending on the mode to optimize performance. The main reason for this is that the source of the input signal changes with each mode. Algorithms that are mainly a function of the input signal power (Compression and Squelch) are sensitive to a change in the nature of the input signal. Hearing Aid mode uses a microphone to pick up sound in the immediate environment. Lapel mode also uses a microphone, but the input signal is sent to the ear module using radio, which can significantly modify the signal characteristics. The input signal in Phone mode originates in a phone on the far end of the call before passing through the cell phone network and the radio transmission channel. The Squelch Kneepoint is set differently in Hearing Aid mode than Phone mode, for example, because the low level noise in Hearing Aid mode produces a lower input signal power than the line noise in Phone mode. The kneepoint is set higher in Phone mode so that the gain is reduced for the line noise.

Also, the modes use different combinations of signal processing algorithms. Some algorithms are not designed for certain modes. The feedback cancellation algorithm is used exclusively in Hearing Aid mode, for example. The algorithm is designed to reduce the feedback from the speaker output to the microphone input on the device. This feedback does not exist in either of the other modes because the signal path is different in both cases. The noise reduction algorithm is optimized for the hearing aid mode in noisy situations, and used in a "noise" preset in hearing aid mode, in which the directional microphone is used as well. The phone mode alone uses the Automatic Noise Compensation (ANC) algorithm. The ANC algorithm samples the environmental noise in the user's immediate surroundings using the omnidirectional microphone and then conditions the incoming phone signal appropriately to enhance speech intelligibility in noisy conditions.

The software in the device reads the Configuration Register value for the current mode to determine which algorithms should be selected. According to an embodiment of the ear module, the presets are stored in a parameter table in the non-volatile memory 54 using the radio in a control channel mode.

The configuration host 13 (FIG. 1) includes a radio interface and computer programs adapted for reading and writing presets on the ear module and for pairing a companion microphone with the ear module. In a preferred embodiment, the system is adapted to operate from within NOAH 3, to facilitate storing prescriptions that specify the hearing profile of the user into the ear module 10. See, NOAH Users Manual, Version 3, Hearing Instrument Manufacturers' Software Association HIMSA, 2000. NOAH 3 provides a means of integrating software applications from hearing instrument manufacturers, equipment manufacturers and office management system suppliers, and is widely adopted in the hearing aid markets.

Figure 11:
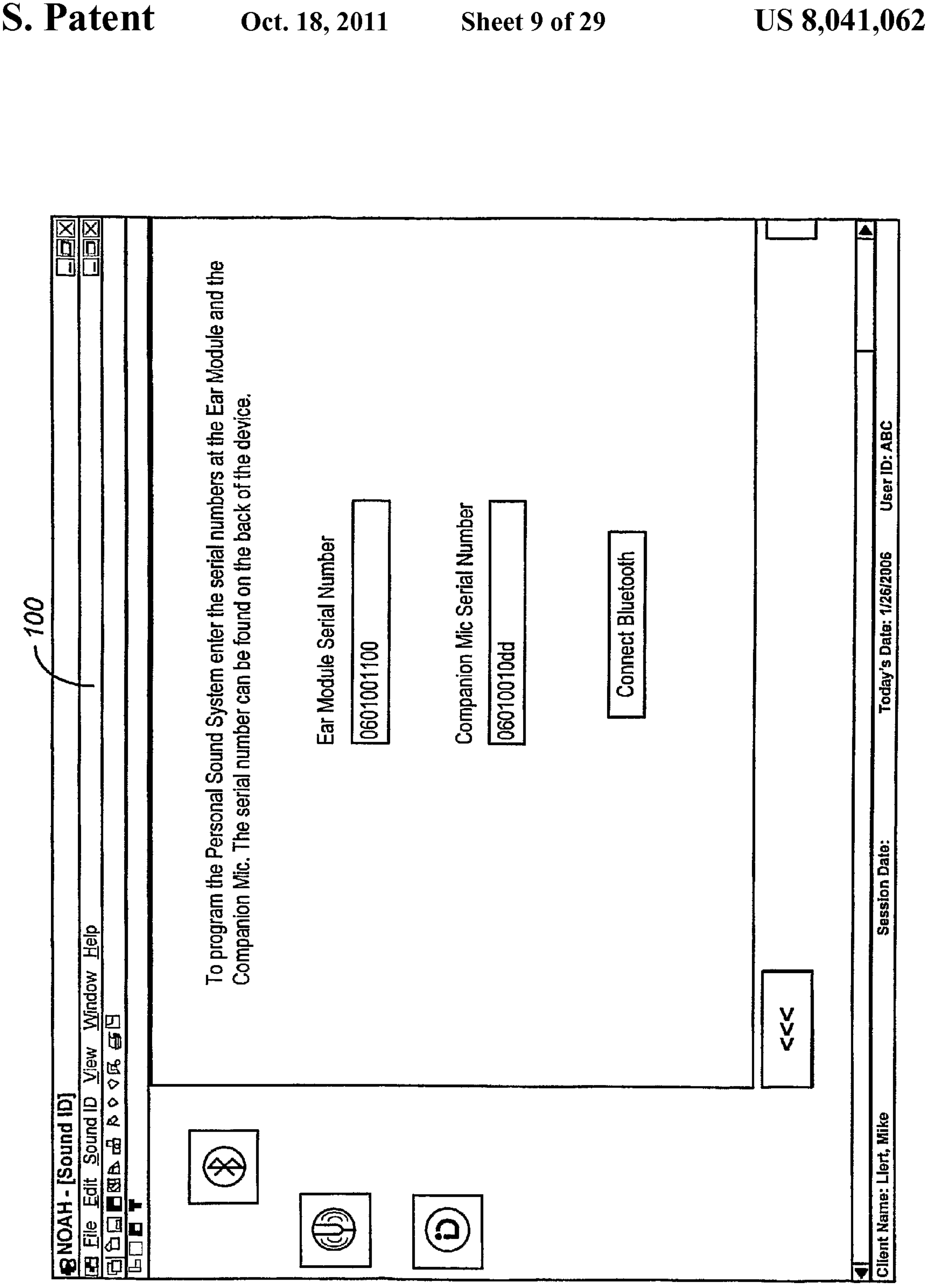
FIG. 11 is an image of a first user interface screen on a configuration host.
Figure 12:
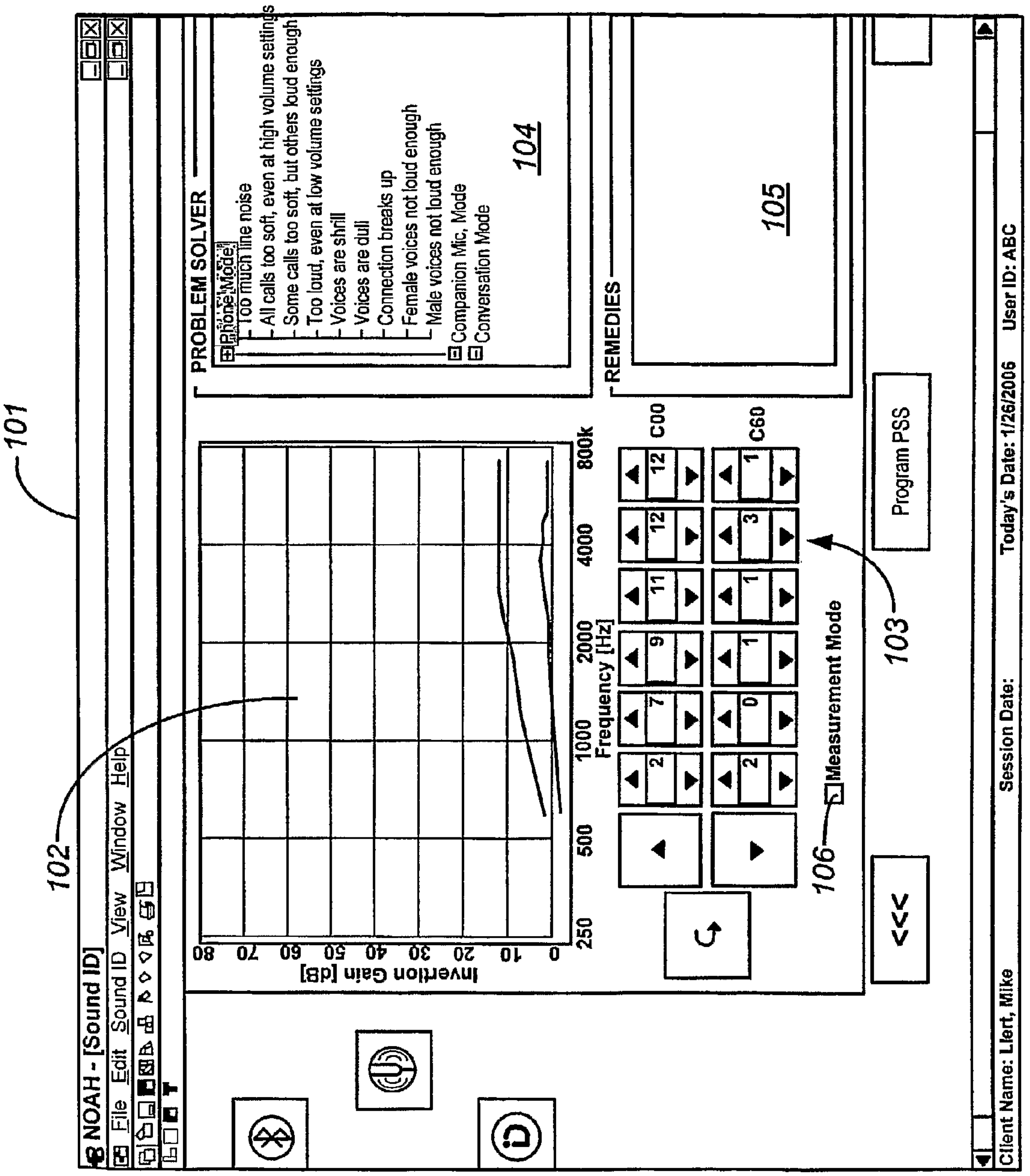
FIG. 12 is an image of a second user interface screen on a configuration host.
Figure 13:
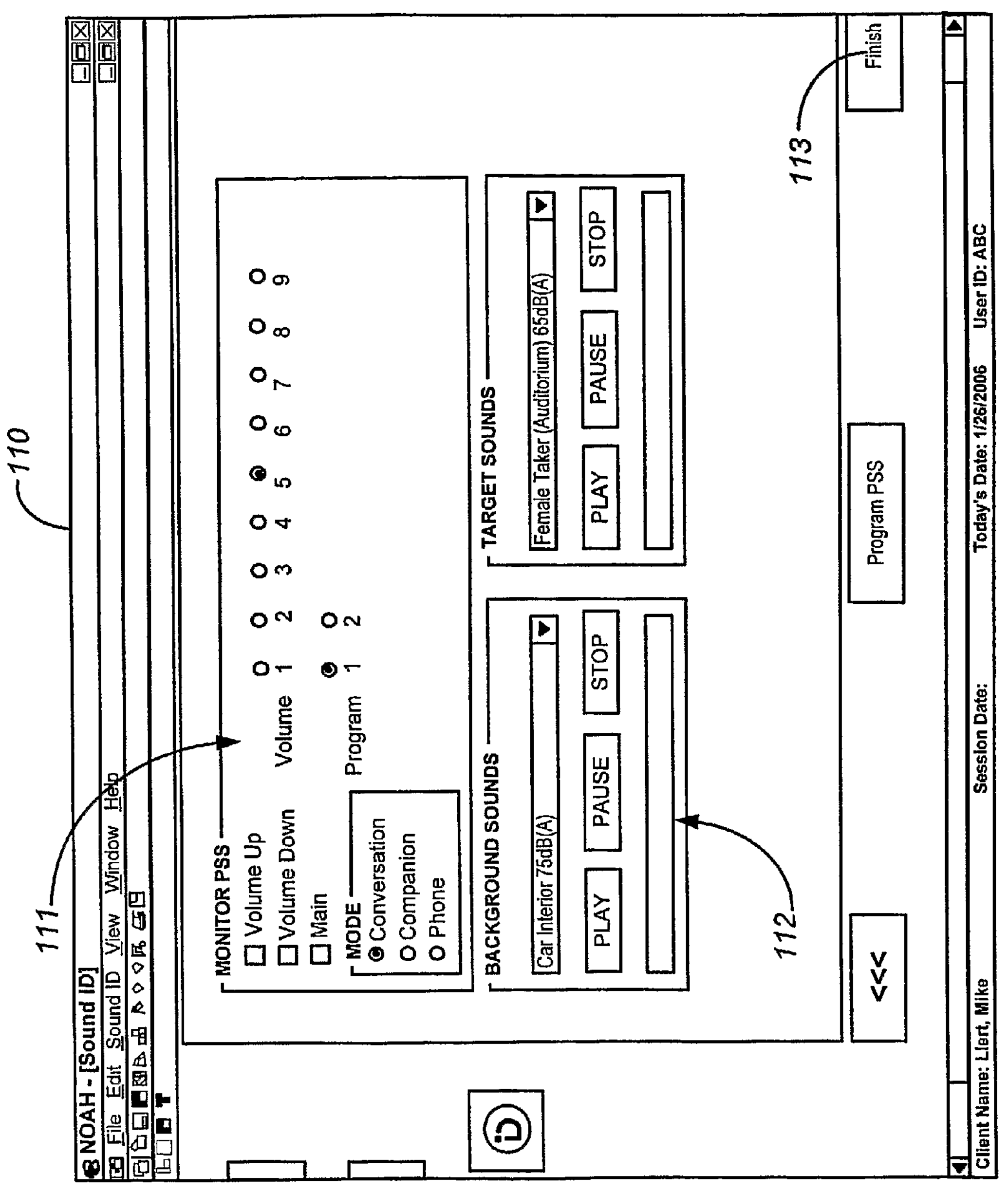
FIG. 13 is an image of a third user interface screen on a configuration host.

FIGS. 11, 12 and 13 illustrate screens in a graphical user interface 104 for the configuration programs on the configuration host 13. The graphical user interface includes three basic screens, including a pairing and connecting screen (FIG. 11), a fine tuning screen (FIG. 12), and a practice screen (FIG. 13).

The pairing and connecting screen 100 shown in FIG. 11 is used to pair the ear module with a companion microphone and with the computer during the fitting process. The user interface shown in FIG. 11 is displayed by the program, prompting the user to enter serial numbers for the ear module and companion microphone, which are utilized by the program for establishing point-to-point connections between the ear module and the companion microphone. The program accepts the serial numbers and the user directs it to execute an algorithm for connecting to the ear module and companion microphone using Bluetooth. The ear module and companion microphone are set in the pair mode by the user by pressing and holding the buttons on devices for a predetermined time interval. Successful pairing and connection are acknowledged by the user interface.

To facilitate fine tuning the presets of the ear module in the various modes of operation, the fine tuning screen 101 shown in FIG. 12 is represented by the software on the configuration host 13. In the illustrated embodiment, the screen 101 includes a graph 102 showing insertion gain versus frequency for the mode being fine tuned, such as the hearing aid mode. Initial settings are derived from the user's audiogram, or other personal hearing profile data, in a representative embodiment using the NOAH 3 system or other technique for communicating with the ear module. After the ear module has been initially programmed, the settings for gain are read from the non-volatile memory on the ear module itself.

The top curve on graph 102 shows the gain applied to a 50-dB input signal, and the lower curve shows the gain applied to an 80-dB input signal. The person running the test program can choose between simulated insertion gain and 2-CC coupler gain by making a selection in a pulldown menu. The displayed gains are valid when the ear module volume control is at a predetermined position, such as the middle, within its range. If the ear module volume is adjusted, the gain values on the fine tuning screen are not adjusted in one embodiment. In other embodiments, feedback concerning actual volume setting of ear module can be utilized. In one embodiment, after the ear module and configuration computer are paired, the volume setting on the ear module is automatically set at the predetermined position to facilitate the fine tuning process.

The user interface 101 includes fine tuning buttons 103 for raising and lowering the gain at particular frequency bands for the two gain plots illustrated. These buttons permit fine tuning of the response of the ear module by hand. The gain for each of the bands within each plot can be raised or lowered in predetermined steps, such as 1-dB steps, by clicking the up or down arrows associated with each band. Each band is controlled independently by separate sets of arrow buttons. In addition, large up and down arrow buttons are provided to the left of the individual band arrows, to allow raising and lowering again of all bands simultaneously. An undo button (curved counterclockwise arrow) at the far left reverses the last adjustment made. Pressing the undo button repeatedly reverses the corresponding layers of previous changes.

The changes made using the fine tuning screen 101 are applied immediately via the wireless configuration link to the ear module, and can be heard by the person wearing the ear module. However, these changes are made only in volatile memory of the device and will be lost if the ear module is turned off, unless they are made permanent by issuing a program command to the device by clicking the "Program PSS" button on the screen. The program command causes the parameters to be stored in the appropriate preset in the parameter tables of the nonvolatile memory.

User interface also includes a measurement mode check box 106. This check box when selected enables use of the configuration host 13 for measuring performance of the ear module with pure tone or noise signals such as in standard ANSI measurements. In this test mode, feedback cancellation, squelch and noise suppression algorithms are turned off, and the ear module's omnidirectional microphone is enabled.

User interface 101 also includes a "problem solver" window 104. Problem solver window 104 is a tool to address potential client complaints. Typical client complaints are organized in the upper portion of the tool. Selections can be expanded to provide additional information. Each complaint has associated with it one or more remedies listed in the lower window 105 of the tool. Clicking on the "Apply" button in the lower window 105 automatically effects a correction in the gain response to the preset within the software, determined to be an appropriate adjustment for that complaint. Remedies can be applied repeatedly to a larger effect. Not all remedies involve gain changes, but rather provide suggestions concerning what counsel to give a client concerning that complaint. Changes made with the problem solver to the hearing aid mode are reflected in a graph. Changes made to the companion microphone mode or phone mode have no visual expression in one embodiment. They are applied even if the ear module is not currently connected to the companion microphone or to a phone.

In the illustrated embodiment, changes to the companion microphone mode and phone mode presets are made using the "problem solver" interface, using adjustments that remedy complaints about performance of mode that are predetermined. Other embodiments may implement fine tuning buttons for each of the modes.

FIG. 13 shows the practice screen 110 for the user interface on a configuration host 13. The practice screen 110 includes a monitor section 111 and a practice section 112. In addition, a "Finish" button 113 is included on the user interface. The Monitor section 111 can be used to both monitor and control volume settings, and to choose or monitor which program or "preset" is in use in the connected ear module. Practice section 112 is used to create an audio environment for fine tuning and demonstration.

The purpose of the monitor section 111 is to monitor a client's successive manipulation of the controls on the ear module when the device is in the user's ear. For example, when the client presses the upper volume button (36 on FIG. 2A), a checkmark appears in the "volume up" check box on the screen for the duration of the button press. If the button press was short, so that the volume was changed, the black dot of the volume indicator will move to the right, showing the new, increased volume setting. If the button press was long, so that the sound preset was changed, the change is reflected in the preset indicator. An indicator is also displayed indicating whether the ear module is in the phone mode, the companion mode, or the hearing aid mode.

The practice section 112 is used to enable resources in the configuration program for playing target and background sounds through the computer speakers. The target and background sounds can be played either in isolation or in concert. The sound labels on the user interface show their A-weighted levels. Different signal to noise ratios can be realized by selecting appropriate combinations of background sounds and target sounds. The absolute level can be calibrated by selecting a calibrated sound field from a pulldown menu (not shown) on the interface. Selecting the play button in the practice window 112 generates a ⅓ octave band centered at 1 kHz at the configuration host's audio card output. The signal is passed from an amplifier to a loudspeaker. The sound level is adjusted on the computer sound card interface, or otherwise, so that it reads 80 dB SPL (linear) on a sound meter. The configuration software can be utilized to fine tune the volume settings and other parameters in the preset using these practice tools.

User interface also includes a "Finish" key 113. The configuration software is closed by clicking on the finish key 113.

FIG. 14 is a state diagram for states involved in power up and power down on the ear module, in addition to the pairing mode. When power is applied as indicated by spot 199, the ear module enters the boot mode 200. In this mode, the processing resources of the ear module are turned on and set up for operation. The power down mode 201 is entered when the user instructs a power down, such as by holding the main button down for less than three seconds. The pairing mode 202 is entered by a user holding a main button down for more than six seconds in this example. In this case, the Bluetooth radio on the ear module becomes discoverable and connectable with a companion module, such as another device seeking to discover the ear module such as a telephone. A hearing aid mode 203 is entered when the pairing is complete, and the processing resources on the ear module are set up according to a selected preset. A hearing aid mode 203 is also entered from the boot mode 200 in response to the user holding down the main button between three and six seconds. In this case, the processing resources on the ear module are set up according to the selected preset. The type of phone coupled with the ear module is determined at block 204. If it is a type 1 phone, then the phone will connect with the ear module according to its selected Bluetooth profile, which is referred to typically as the Headset HS profile or the Handsfree HF profile. If it is not a type 1 phone, then the ear module enters the hearing aid mode 203.

Figure 15:
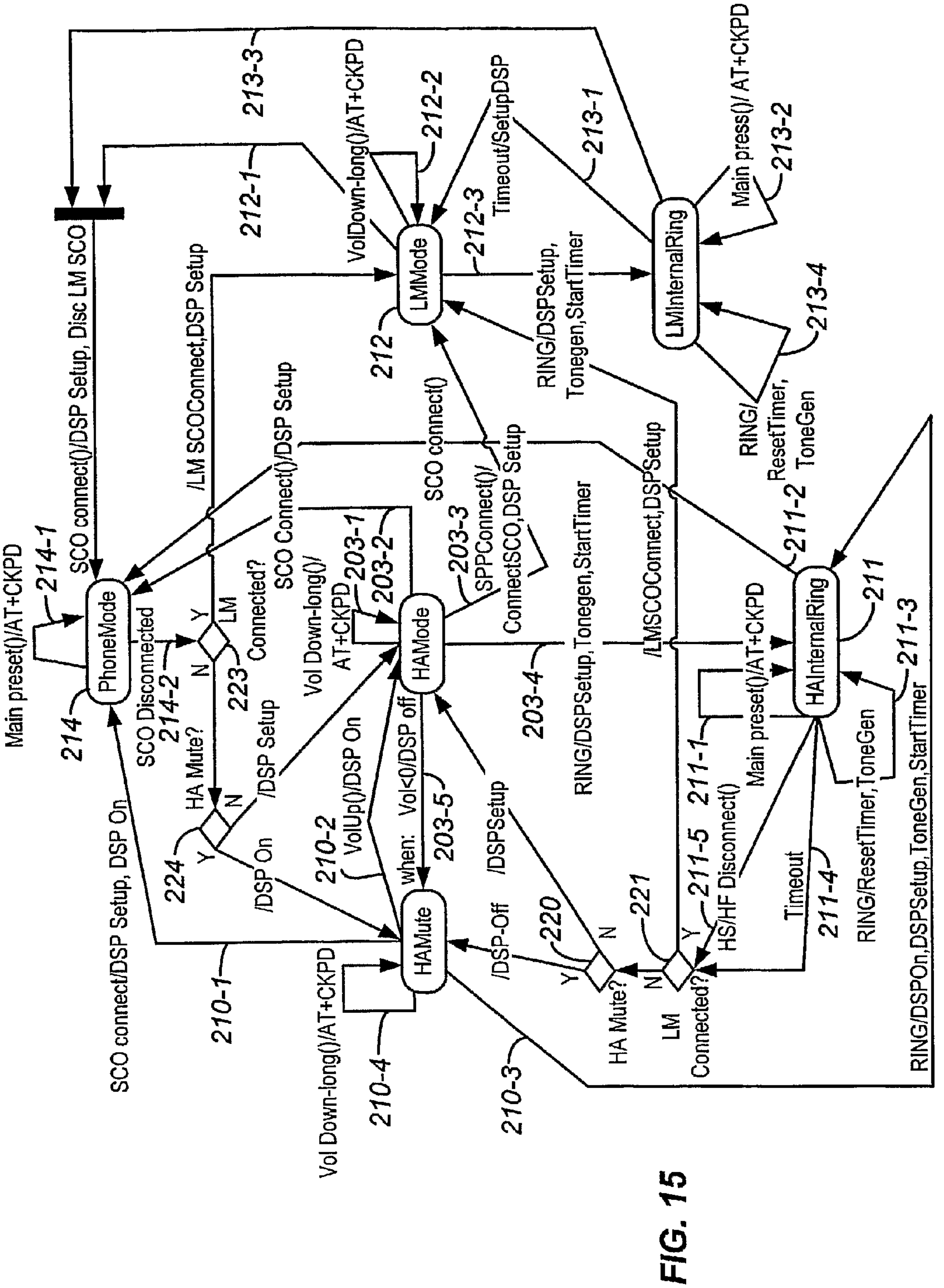
FIG. 15 is a state diagram for modes of operation of the ear module related to audio processing.

FIG. 15 is a state diagram illustrating the main modes for the ear module, and priority logic for switching among the modes. The modes shown in FIG. 15 include the hearing aid mode 203 mentioned above in connection with FIG. 14. Other modes include the hearing aid mute mode 210, which is a power savings mode, in which the user has switched off the hearing aid function but still wishes to receive phone calls and companion microphone connections; hearing aid internal ringing mode 211, in which an incoming call is occurring from the hearing aid mode on a phone that does not support in-band ringing; the companion microphone mode 212 in which the companion microphone is connected to the ear module and audio from the companion microphone is routed to the ear module; companion microphone internal ring mode 213 in which an incoming phone call is occurring from the companion microphone mode on a phone that does not support in-band ringing; and the phone mode 214 in which a phone call is in progress and two-way audio is routed via the Bluetooth SCO link to a phone.

Transitions out of the hearing aid mode 203 include transition 203-1 in response to a user input on a volume down button for a long interval (used to initiate a phone call in this example) on the ear module indicating a desire to connect to the phone. In this case, the signals used to establish the telephone connection are prepared as the ear module remains in hearing aid mode. Then, transition 203-2 to the phone mode 214 occurs after connection of the SCO with the phone, and during which the processor on ear module is set up for the phone mode 214. Transition 203-3 occurs upon a control signal received via the control channel (e.g. modified SPP Bluetooth channel) causing the ear module to transition to the companion microphone mode 212. The SCO channel with the companion microphone is connected and the processor on the ear piece is set up for the companion microphone mode, and the system enters the companion microphone mode 212. Transition 203-4 occurs in a Bluetooth phone in response to a RING indication indicating a call is arriving on the telephone. In this case, the processor is set up for the internal ring mode, a timer is started and the system enters the hearing aid internal ring mode 211. Transition 203-5 occurs when the user presses a volume down button repeatedly until the lowest setting is reached. In response to this transition, the processing resources on the ear module are turned off, and the ear module enters the hearing aid mute mode 210.

Transitions out of the hearing aid internal ring mode 211 include transition 211-1 which occurs when the user presses the main button to accept the call. In this case, signals are generated for call acceptance, and transition 211-2 occurs, connecting a Bluetooth SCO channel with the phone, and transitioning to the phone mode 214. Transition 211-3 occurs in response to the RING signal. In response to this transition, the ring timer is reset and the tone of the ring is generated for playing to the person wearing the ear module. Transition 211-4 and transition 211-5 occur out of hearing aid internal ring mode 211 after a time interval without the user answering, or if the phone connection is lost. In this case, the system determines whether the companion microphone is connected at block 221. If the companion microphone is connected, then a companion microphone Bluetooth SCO channel is connected and the processor is set up for the companion microphone mode. Then the system enters the companion microphone mode 212. If at block 221 the companion microphone was not connected, then the system determines whether a hearing aid mute mode 210 originated the RING signal. If it was originated at the hearing aid mute mode 210, then the processing resource is turned off, and the hearing aid mute mode 210 is entered. If at block 220 a hearing aid mute state was not the originator of the RING, then the processing resources are set up for the hearing aid mode 203, and the system enters the hearing aid mode 203.

Transitions out of the hearing aid mute mode 210 include transition 210-1 which occurs upon connection of the Bluetooth SCO channel with the telephone. In this case, the system transitions to the phone mode 214 after turning on and setting up the processor on the ear module. Transition 210-2 occurs out of the hearing aid mute mode 210 in response to a volume up input signal. In this case, the system transitions to the hearing aid mode 203. Transition 210-3 occurs in response to a RING signal according to the Bluetooth specification. In this case, the processing resources on the ear module are turned on and set up for the internal ring mode, and tone generation and a timer are started. Transition 210-4 occurs if the user presses the volume down button for a long interval. In response, the telephone connect signals are generated and sent to the linked phone.

Transitions out of the companion microphone mode 212 include transition 212-1 which occurs upon connection of the Bluetooth SCO channel to the phone. In this transition, the companion microphone Bluetooth SCO channel is disconnected, and the processor is set up for the phone mode 214. Transition 212-2 occurs when the user pushes the volume down button for a long interval indicating a desire to establish a call. The signals establishing a call are generated, and then the transition 212-1 occurs. Transition 212-3 occurs in response to the RING signal according to the Bluetooth specification. This causes setup of the processor for the internal ring mode, starting tone generation and a timer.

In companion microphone internal ring mode 213, transition 213-1 occurs upon time out, causing set up of the processor for the companion microphone mode 212. Transition 213-2 occurs when the user presses the main button on the companion microphone indicating a desire to connect a call. The call connection parameters are generated, and transition 213-3 occurs to the phone mode 214, during which the Bluetooth SCO connection is established for the phone, the Bluetooth SCO connection for the companion microphone is disconnected, and the processing resources are set up for the phone mode. Also, transition 213-4 occurs in response to the RING signal, in which case the timer is reset and tone generation is reinitiated.

In phone mode 214, transition 214-1 occurs when user presses the main button on the ear module, causing signals for disconnection to be generated. Then, a Bluetooth SCO connection is disconnected and transition 214-2 occurs. During transition 214-2 the system determines at block 223 whether the companion microphone was connected. If it was connected, then the companion microphone Bluetooth SCO channel is reconnected, and the processing resources are set up for the companion microphone mode 212. If at block 223 the companion microphone was not connected, then at block 224 the system determines whether the phone originated in the hearing aid mute mode 210. If the system was in the hearing aid mute mode, then the processing resources are turned off, and the hearing aid mute mode 210 is entered. If the system was not in the hearing aid mute mode 210 during a call, then the system is set up for the hearing aid mode 203, and transitions to the hearing aid mode 203.

The state machines of FIG. 14 and FIG. 15 establish a priority for operation of the phone mode, hearing aid mode and companion microphone mode and provide for dynamic transition between the modes. Other priority and dynamic transition models may be implemented. However, priority and dynamic transition models enable effective operation of a personal sound system based on an ear module as described herein.

Figure 16:
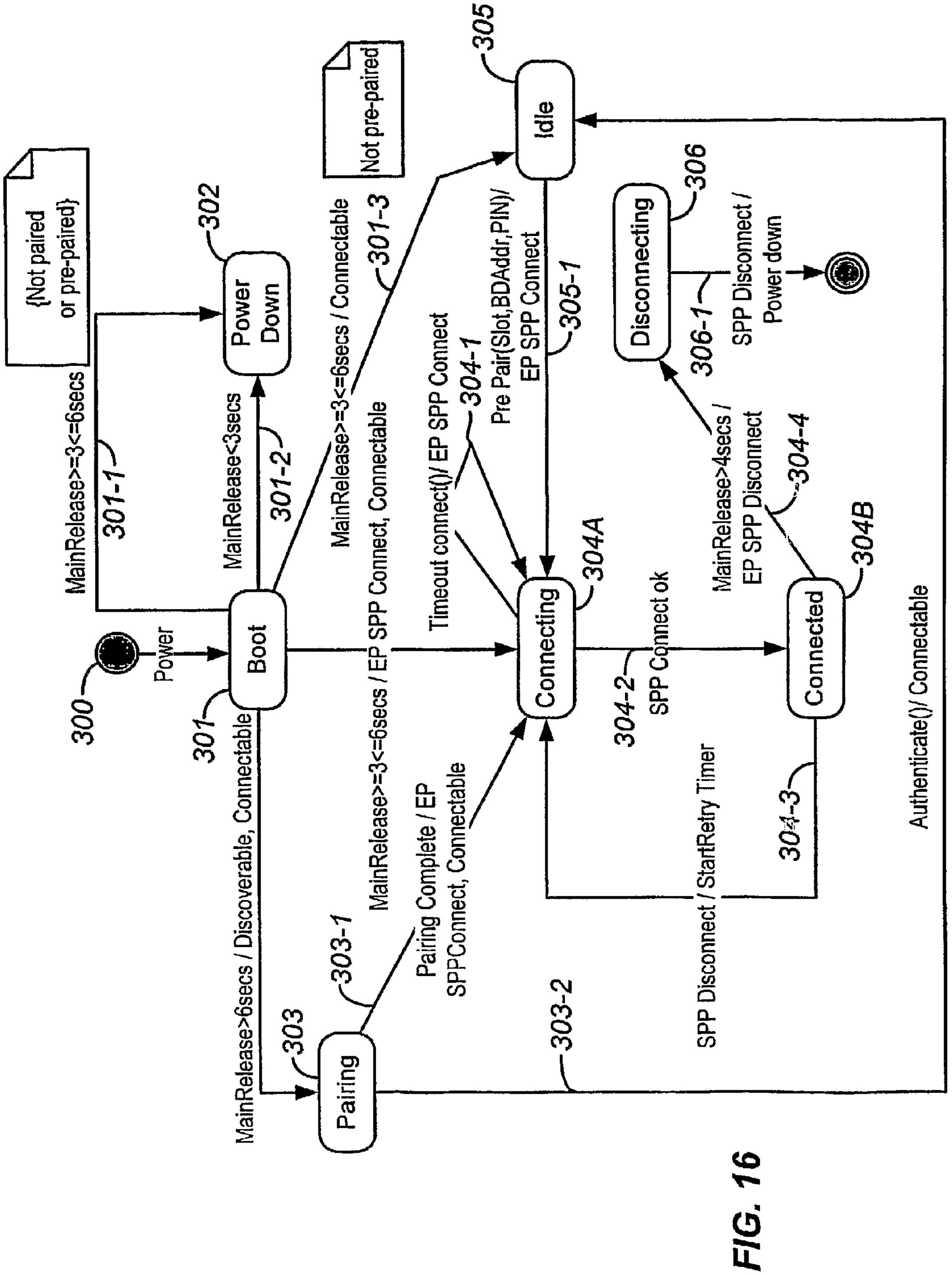
FIG. 16 is a state diagram for modes of operation of the companion microphone.

FIG. 16 illustrates the state machine implemented by processing resources on the companion microphone. The companion microphone includes the boot mode 301, which is entered when the system is powered up as indicated by block 300. In the boot mode 301 the processor resources on the companion microphone are initialized. The companion microphone also includes a power down mode 302 which is entered when the user instructs a power down of the companion microphone. Also, a pairing mode 303 is included in which the user has initiated a pairing operation. A connecting mode 304A and a connected mode 304B are included, used when the companion microphone is connecting or connected with a previously paired ear module. An idle mode 305 is included when the companion microphone is powered up without a pre-paired ear module. This mode is entered during the configuration process described above. A disconnecting mode 306 is implemented for disconnecting the link to the ear module before powering down the processing resources on the companion microphone.

Transitions out of the boot mode 301 include transition 301-1 where the user has pressed the main button on the companion microphone between three and six seconds without a paired or pre-paired ear module. In this case, the companion microphone enters the power down mode 302. Transition 301-2 occurs when the user has pressed the main button on the companion microphone for less than three seconds whether or not there is a paired or a pre-paired ear module. Again, in this case the system enters the power down mode 302. Transition 301-3 occurs from the boot mode 301 to the idle mode 305 if the ear module is not pre-paired with the companion microphone. This occurs when the user presses the main button between three and six seconds. The companion microphone becomes connectable to the ear module after the pre-pairing operation is completed.

Transitions out of the pairing mode 303 include transition 303-1 which occurs when a pairing operation is complete. In this case, the ear module control channel connected command is issued and the system is connectable. In this case, the system enters the connecting mode 304A. Transition 303-2 occurs out of the pairing mode 303 in response to an authenticate signal during a pairing operation with the configuration host in a companion module that is not pre-paired. In this case, the system becomes connectable to the configuration host and enters the idle mode 305.

A transition 305-1 out of the idle mode 305 occurs in response to a pre-pair operation, which provides the prepairing slot, the Bluetooth device address (BD_ADDR) and PIN number to pre-pair the companion microphone with a specific ear module. Once the pre-pairing parameters are provided, the control channel can be connected with the ear module, and the process enters the connecting mode 304A.

In the connecting mode 304A, transition 304-1 occurs upon a time out in an attempt to connect with the ear module. In this case, after the time out a new control channel connect command is issued. Transition 304-2 occurs after a successful connection of the control channel to the ear module. Upon successful connection, the ear module enters a connected mode 304B. Transition 304-3 from the connected mode 304B occurs upon a disconnect of the control channel connection, such as may occur if the ear module is moved out of range. In this case, a retry timer is started and the process transitions to the connecting mode 304A. Transition 304-4 from the connected mode 304B occurs if the user presses the main button for more than four seconds during the connected mode 304B. In this case, the earpiece control channel is disconnected, and the system enters the disconnecting mode 306. From the disconnecting mode 306, a transition 306-1 occurs after successful disconnection of the control channel and the power down occurs.

Figure 17:
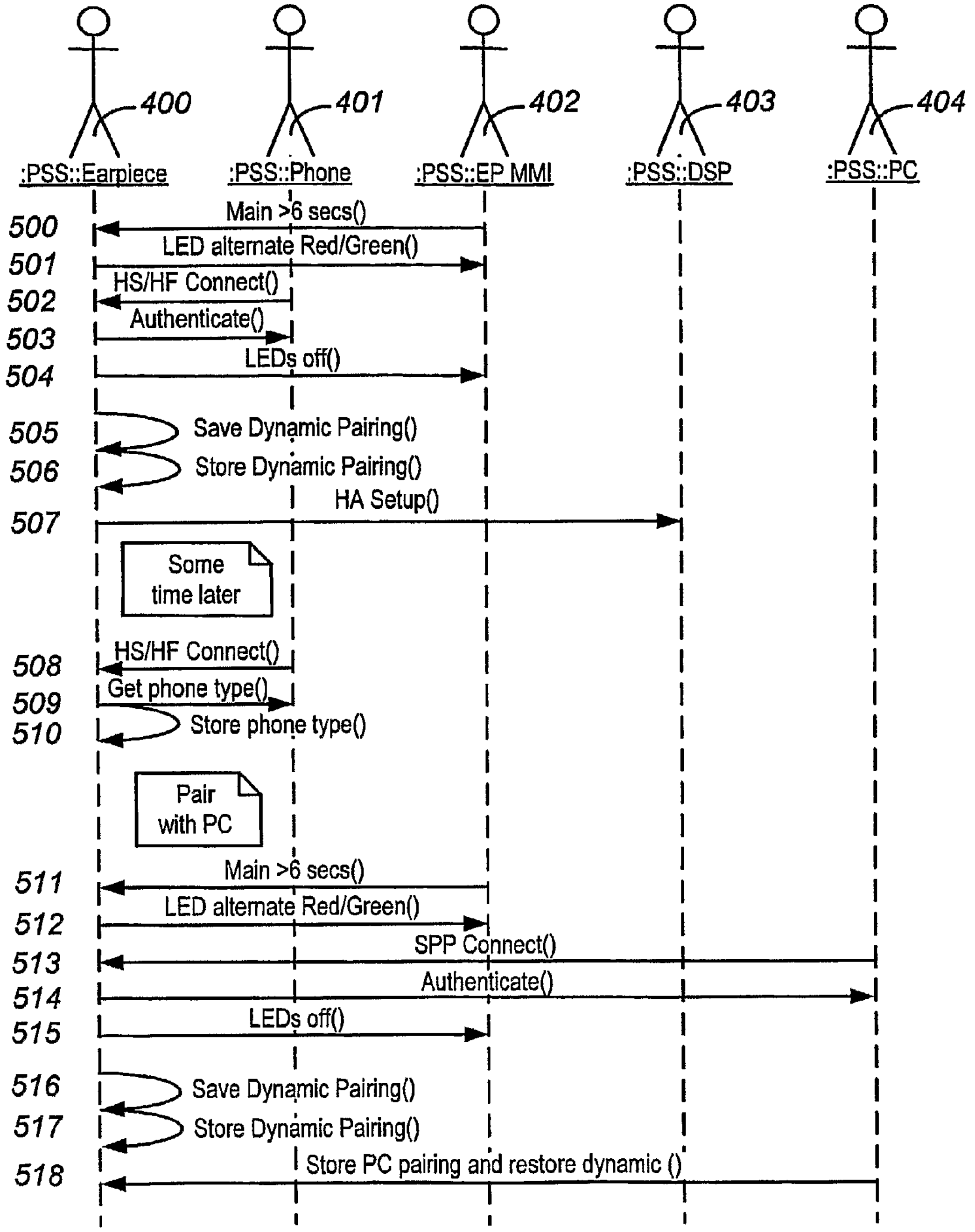
FIG. 17 illustrates a dynamic model for pairing the multimode ear module with a telephone and the configuration processor.

A dynamic model for dynamic pairing of the ear module with a phone and with a configuration host is shown in FIG. 17. The actors in the dynamic model include the earpiece radio 400 (part of the ear module managed by the processor in the radio in the embodiment), the phone 401, the man-machine interface 402 on the ear module, the data processing resources (DSP) on the ear module and a configuration host 404. Pairing with a phone is initiated by the user pressing a main button for more than six seconds (500). The earpiece flashes the status light red and green when the pairing mode is entered (501). The ear module configures for the hearing aid mode (not shown), and plays a pairing tone (not shown), in one embodiment. If the phone is in the pairing mode, the appropriate connect signal is issued to the earpiece (502). The earpiece forces an authentication process with the phone (503) and turns off the status light (504). When the authentication process is complete, the ear module receives a link key for the phone. The current dynamic pairing slot for an SCO communication link is saved in a temporary slot in memory (505, 506). The earpiece then signals the processing resources on the ear module to set up for the hearing aid mode (507). At this point, the type of phone is unknown. Sometime later, the phone issues a connect signal (508). The ear module determines the phone type and stores a type indicator in memory (509, 510).

The process for pairing with the configuration processor starts with the user holding down the main button for more than six seconds (511). The status lights are enabled flashing red and green (512). After dynamic pairing of an SCO channel between the ear module and the configuration processor, similar to that described for the phone, dynamic pairing parameters for the ear module and the phone are saved in a temporary slot, and replaced by the dynamic pairing parameters for the ear module with the configuration processor. The ear module sets the processing resources to the hearing aid settings. Later the configuration host can access the ear piece using a control channel (513). The earpiece forces an authentication (514), and receives a link key for the configuration processor. After the authentication, the status lights are turned off (515). The dynamic pairing parameters for the phone are restored (516, 517), and the earpiece stores the configuration host pairing information for the control channel connection (518).

Figure 18:
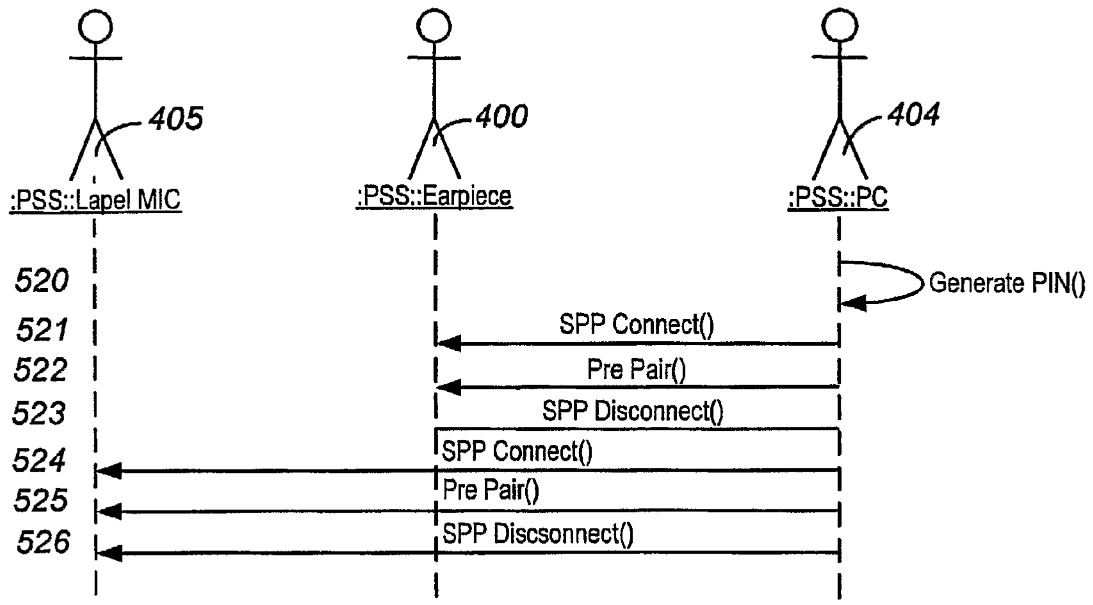
FIG. 18 illustrates a dynamic model for linking the multimode ear module with a companion microphone.

FIG. 18 illustrates a pre-pairing dynamic model for the companion microphone 405, earpiece 400 and configuration processor 404. The procedure begins by generating a PIN number for the session at the configuration host (520), or entry of a unique key by the operator of the configuration host, where the PIN number is unique to the pair of modules. Then the configuration host issues a control channel connect command to the ear module (521). Using the control channel, a pre-pair command is issued providing parameters for pre-pairing the ear module with the companion microphone (522). Then the control channel is disconnected from the ear module (523). Next, the configuration host issues a control channel connect command with the companion microphone (524). Then the pre-pair command is issued, providing parameters for pre-pairing with the ear module (525). Then the control channel disconnect command is issued (526).

Figure 19:
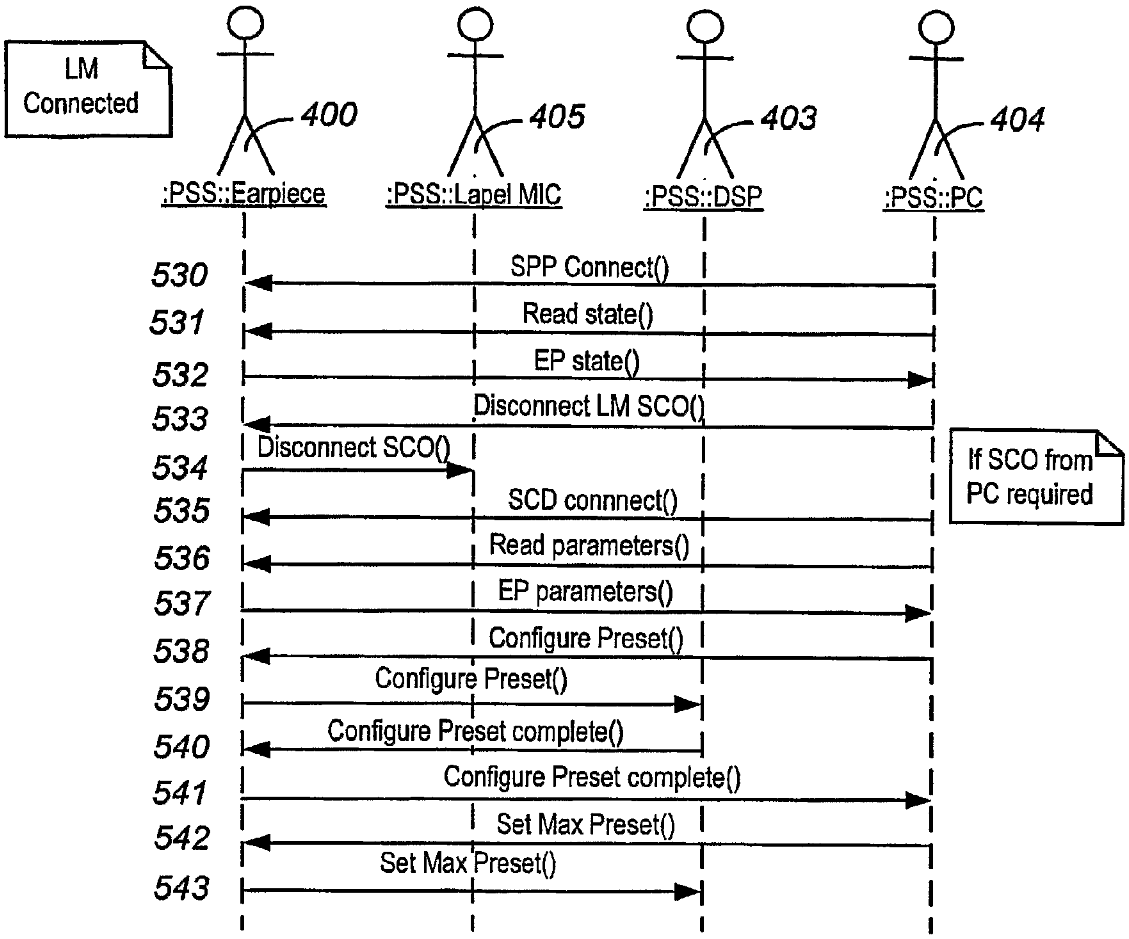
FIG. 19 illustrates a dynamic model for configuring the multimode ear module and companion microphone.

FIG. 19 shows a dynamic model for a configuration sequence between a configuration host and the ear module. The process is initiated by a control channel connect command from the configuration host (530). After the connection, the configuration host issues a read state command (531). The state of the ear module is provided to the configuration host (532). If the companion microphone is connected, then a disconnect companion microphone SCO channel command is issued to the ear module (533). The SCO channel with the companion microphone is then disconnected (534). The configuration host then initiates an SCO channel with the ear module and a read parameter command is issued (535, 536). The earpiece parameters are provided to the configuration host using the SCO channel (537). The configuration host then issues a configuration of preset parameters set to the earpiece (538) and processing resources on the ear module are configured using a preset (539). The preset configuration is complete on line 540. The earpiece issues a configuration preset complete signal to the configuration processor (541). Then a set max preset command identifying the number of presets allowed for the given mode of operation is issued to the earpiece (542). The max preset is set on the processing resources on ear module (543), and stored in non-volatile memory. In the illustrated embodiment, the data structures are set up for four presets per mode of operation, and the max preset command is set from 1 to 4 for each allowed mode.

Once a configuration host is connected to the ear module, a variety of commands may be issued to read state information in parameters. The configuration host also issues commands to configure preset settings for the various modes according to the needs of the user. As part of this process, the configuration host may set up an SCO channel. In this case, the ear module drops existing SCO channels. The configuration host may then use the SCO channel to play audio samples to the user during the fine tuning process as described above.

Similar monitoring and control functions are implemented between the configuration host and the companion microphone, and therefore need not be described again.

Figure 20:
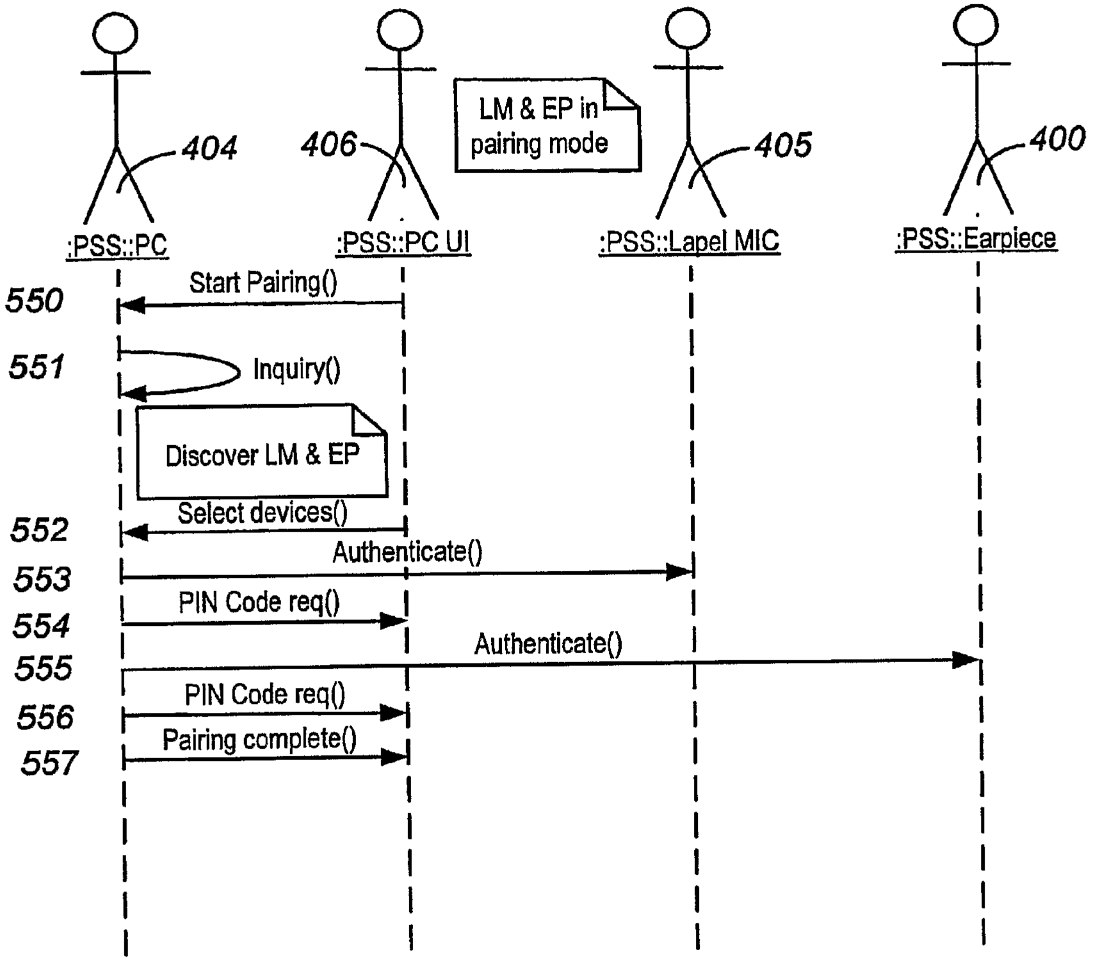
FIG. 20 illustrates a dynamic model for pairing the multimode ear module with the companion microphone.

FIG. 20 shows a software dynamic model for the configuration host during the pairing mode. A start pairing command is issued using the configuration host user interface (550). The radio on the configuration host enters an inquiry mode to discover the companion microphone and ear module (551). Using the user interface, the companion microphone and ear module are selected for configuration and connections are established (552). The configuration host performs an authentication with the companion microphone (553). The configuration host requests entry of the PIN code prestored on the companion microphone which is available from literature associated with the device, usually 0000 or another generic code, from the configuration host user interface (554). Then an authentication occurs with the ear module (555), and the PIN code is requested and entered (556). Finally, the pairing is complete (557), allowing communication between a configuration host and the components of the personal hearing system. The configuration host stores resulting link keys for use in future connection attempts.

Figure 21:
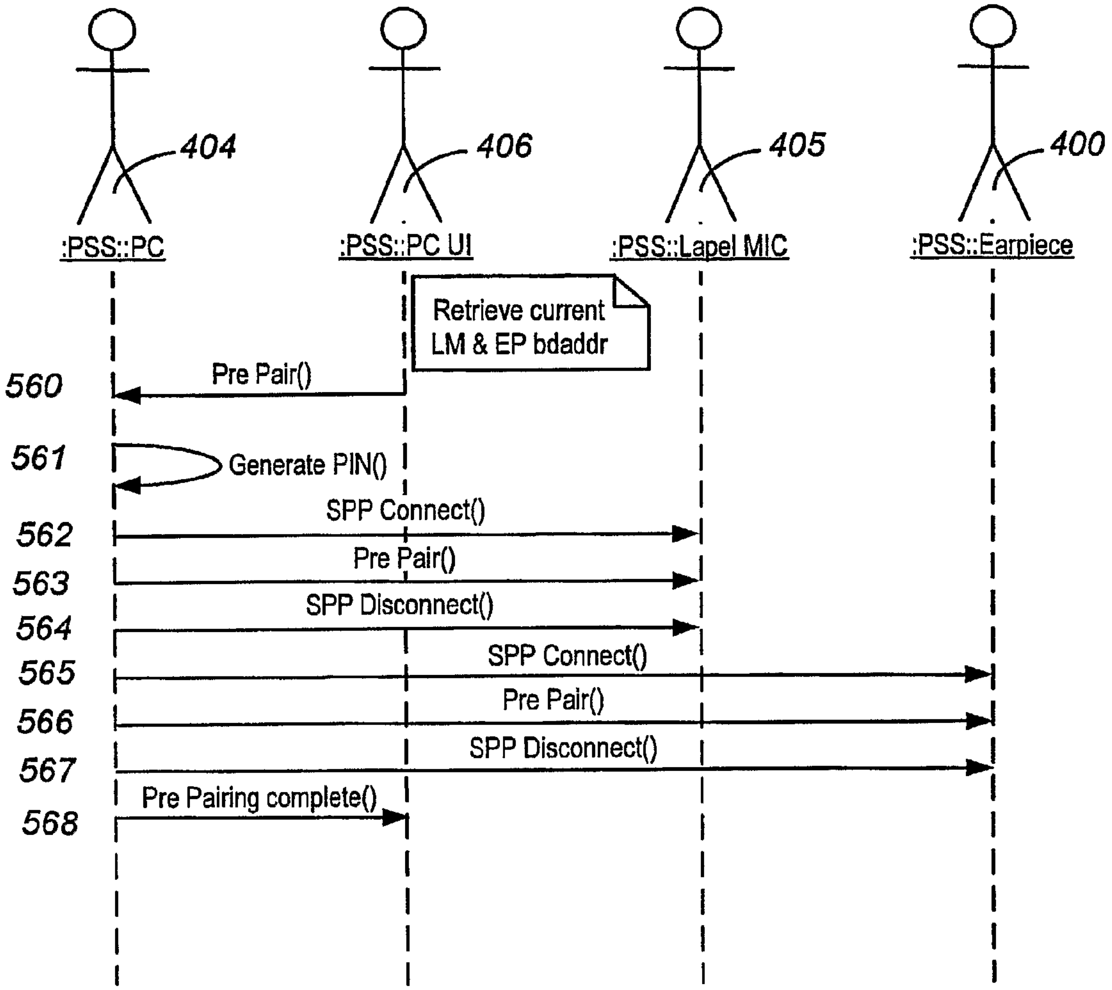
FIG. 21 illustrates a dynamic model for a pre-pairing operation between the multimode ear module and the companion microphone.

FIG. 21 is a software dynamic model for the configuration host pre-pairing mode. In this process, the Bluetooth address of the companion microphone and the ear module are selected by the configuration host software. The configuration host user interface signals a pre-pair command (560). The configuration host generates a PIN unique to the pair of devices and stores the result (561). The configuration host connects to the companion microphone using a control channel (562) and issues a pre-pair command (563), providing the unique PIN code and the Bluetooth device address of the peer personal sound system device. Next, the control channel with the companion microphone is disconnected (564), and a control channel connect command is issued to the ear module (565). A pre-pair command is issued to the ear module (566) on the control channel, providing the unique PIN code and Bluetooth device address of the peer device to the ear module. Then a control channel disconnect is issued to the ear module (567) and a pre-pairing complete signal is provided on the configuration host user interface (568).

Figure 22:
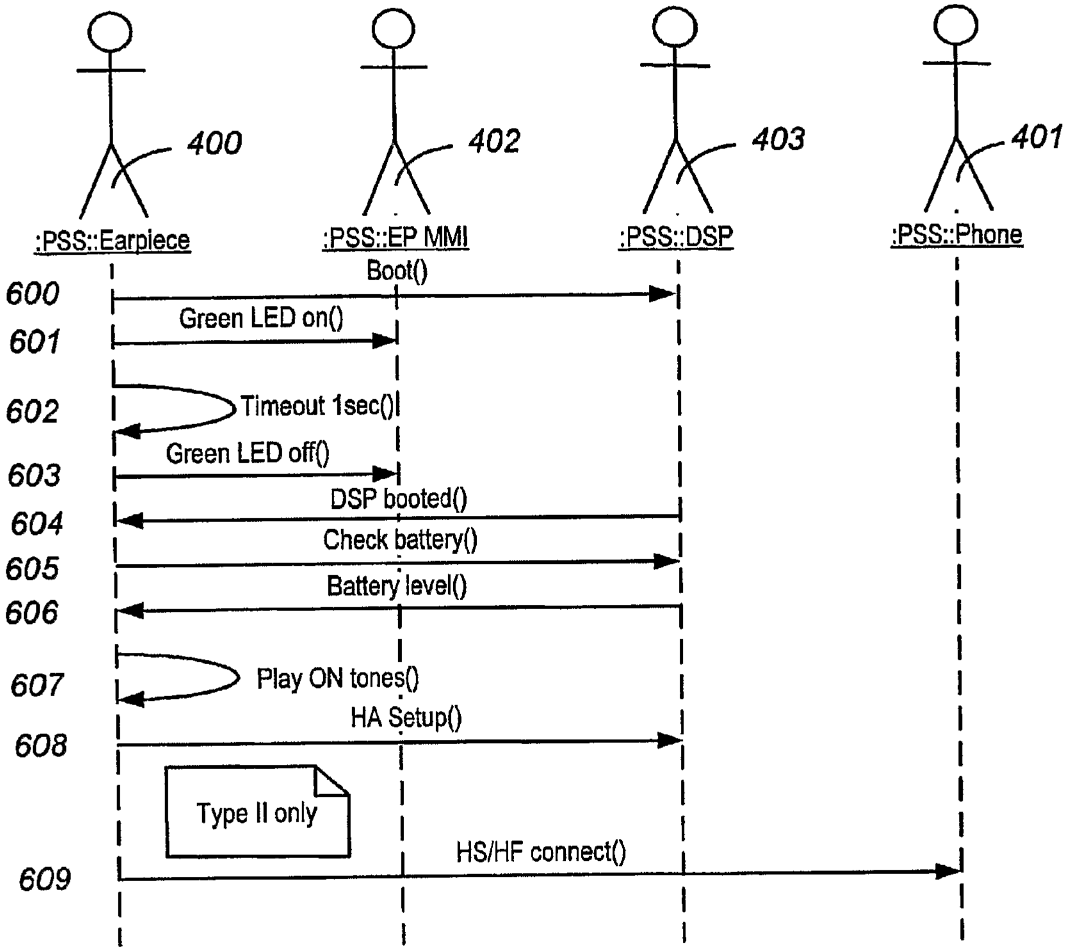
FIG. 22 illustrates a dynamic model for power on processing on the multimode ear module.

FIG. 22 illustrates a dynamic model of firmware executed on the ear module 400 at a power on event on the ear module. At a power on when the user presses the main button, the processing resources execute a boot program (600). A command is sent to the man-machine interface 402 to light with a green LED (601). A one second timer is executed (602) and when it expires the green LED is turned off (603). When the boot process is complete, the processing resources signal completion (604). Battery power is checked and the battery level is read by the ear module (605, 606). Audio tone data from the memory is retrieved and played to indicate that the earpiece is on (607). A routine is executed to set up the processing resources on the ear module for the hearing aid mode (608). If the user pressed the main button between 3 and 6 seconds, for a type II phone, the HF or HS profile channel is connected at this stage (609). For a type I phone, the channel is not connected at this time.

Figure 23:
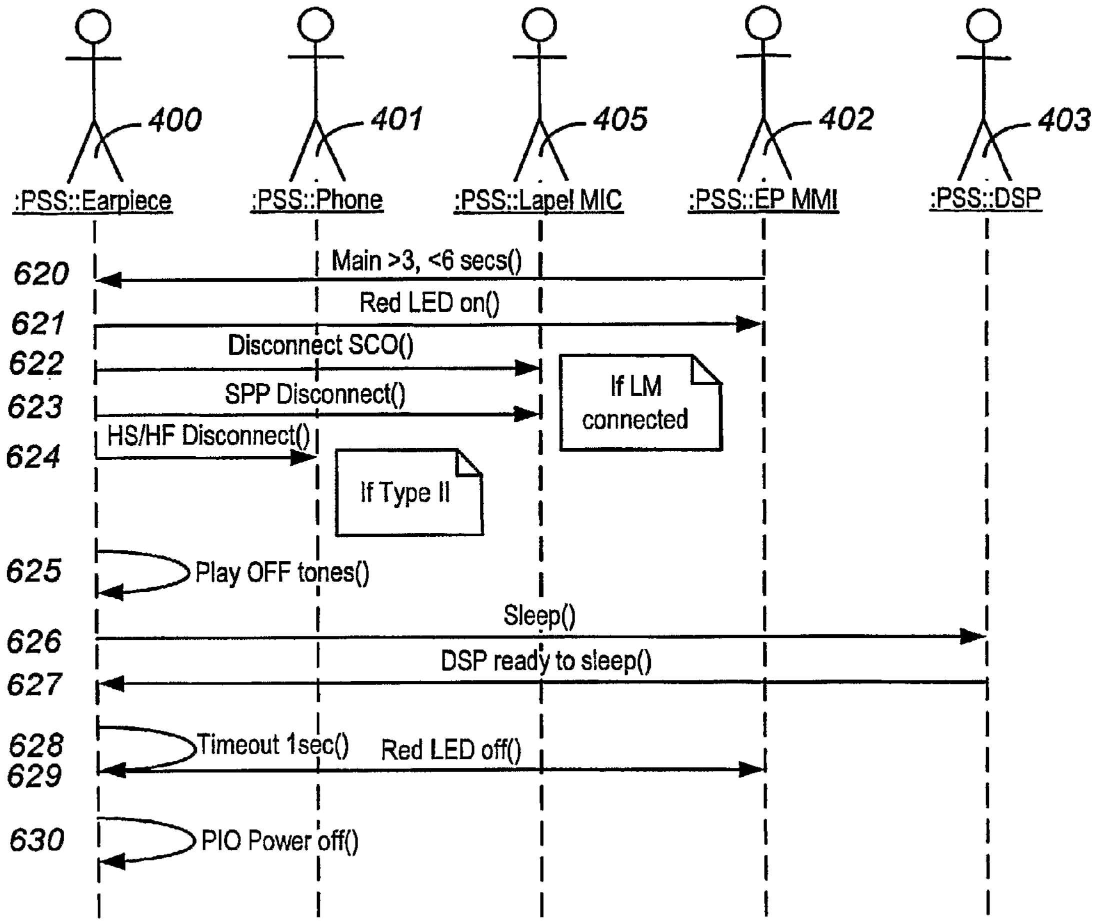
FIG. 23 illustrates a dynamic model for power off processing on the multimode ear module.

FIG. 23 illustrates a dynamic model for a power off the event on the ear module 400. The power off event is signaled by the user holding down the main button more than three seconds (620). In response, a red LED is turned on (621). Any SCO channel with the companion microphone 405 is disconnected (622). In addition, any control channel established with the companion microphone 405 is disconnected (623). For a type II phone, the HS or HF profile channel is disconnected as well (624). An off tone is retrieved and played (625). The DSP is commanded to enter a sleep mode (626), and issues a ready signal (627). After a one second interval (628), the red LED is turned off (629), and the power latch powers off (630). The ear module will then be unresponsive, and after both dropping the power latch and release of the main button, power will go off.

Figure 24:
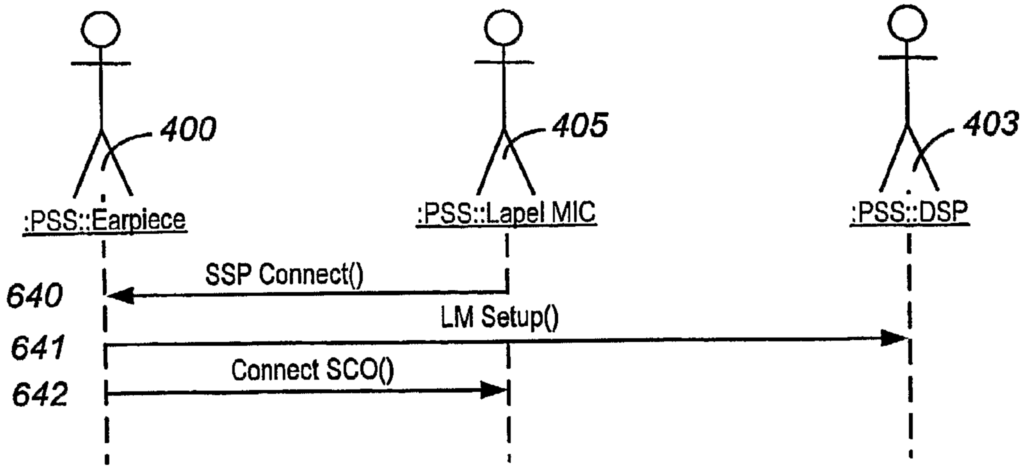
FIG. 24 illustrates a dynamic model for power on of the companion microphone processing on the ear module.

FIG. 24 illustrates a dynamic model for detection of a companion microphone 405 powering on. Upon a power on event, the companion microphone 405 issues a control channel connect command (640). The ear module configures the processing resources for the companion microphone mode (641). Then, the ear module establishes an audio channel with the companion microphone using the Bluetooth SCO protocol (642).

Figure 25:
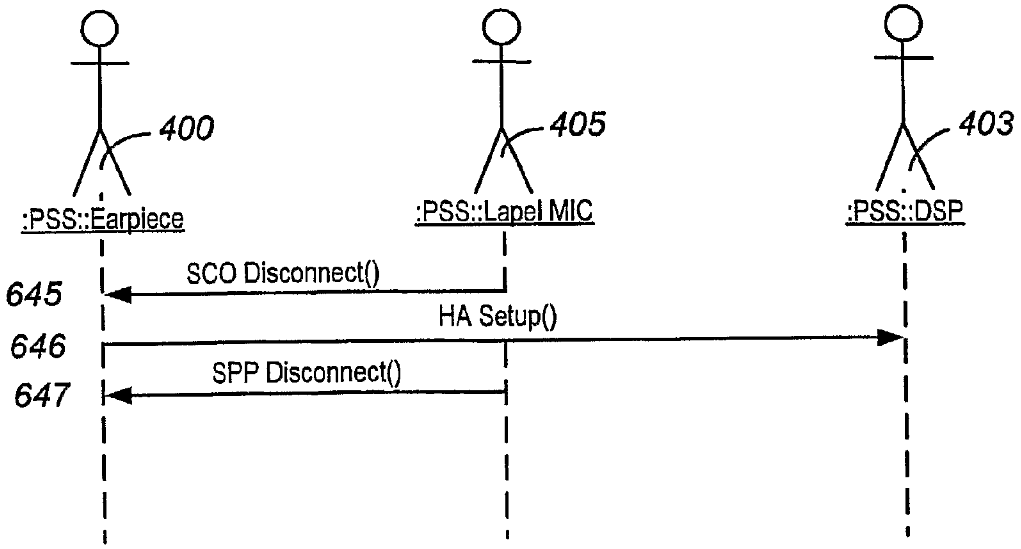
FIG. 25 illustrates a dynamic model for power off of the companion microphone processing on the ear module.

FIG. 25 illustrates a dynamic model for detection of the companion microphone 405 powering off. Upon a power off event, the companion microphone 405 issues a SCO disconnect command (645). The ear module 400 performs a hearing aid mode set up process (646). The companion microphone 405 then issues a control channel disconnect signal (647).

Figure 26:
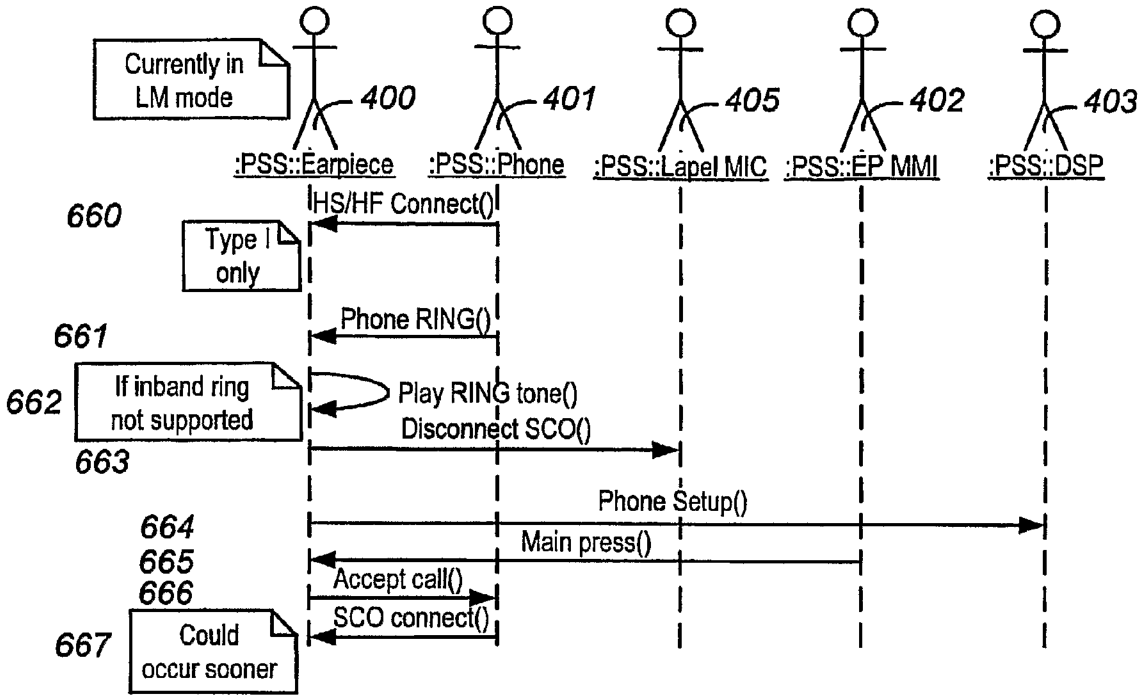
FIG. 26 illustrates a dynamic model for processing an incoming call on the ear module.

FIG. 26 illustrates a dynamic model for handling an incoming call on the ear module 400, assuming that the module is currently in the companion microphone mode. For a type I phone, the phone first attempts to establish an HS or HF profile connection with the ear module (660). For a type II phone, the connection is already in place. Using the connection, the phone will issue a phone ring command (661). The ear module 400 plays a ring tone (662). The ear module disconnects the SCO channel with the companion microphone (663), and performs a phone mode set up process (664). When the user presses the main button to accept the call (665), an appropriate indication is sent to the phone to accept the call (666), and the phone initiates a SCO channel with the ear module (667). For a phone that performs in-band ringing, the phone will set up an SCO channel early and send ringing across the audio channel. In this case, the ear module does not play its own stored ring tone.

Figure 27:
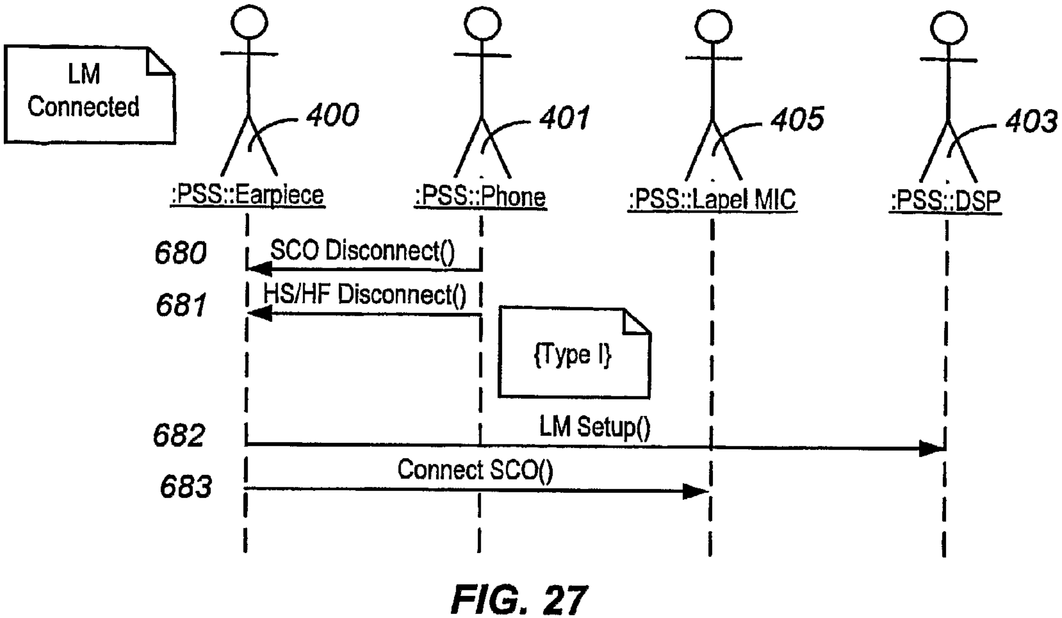
FIG. 27 illustrates a dynamic model for ending a call by the phone on the multimode ear module.

FIG. 27 illustrates a dynamic model for the case in which the ear module is in the phone mode, and the phone ends a call, assuming that the companion microphone is connected. When the phone ends a call, it issues a SCO disconnect command (680). In addition, if it is a type I phone, it disconnects the HS or HF profile connection as well (681). Then, the ear module executes a companion microphone set up process (682), and establishes the audio channel with the companion microphone (683).

Figure 28:
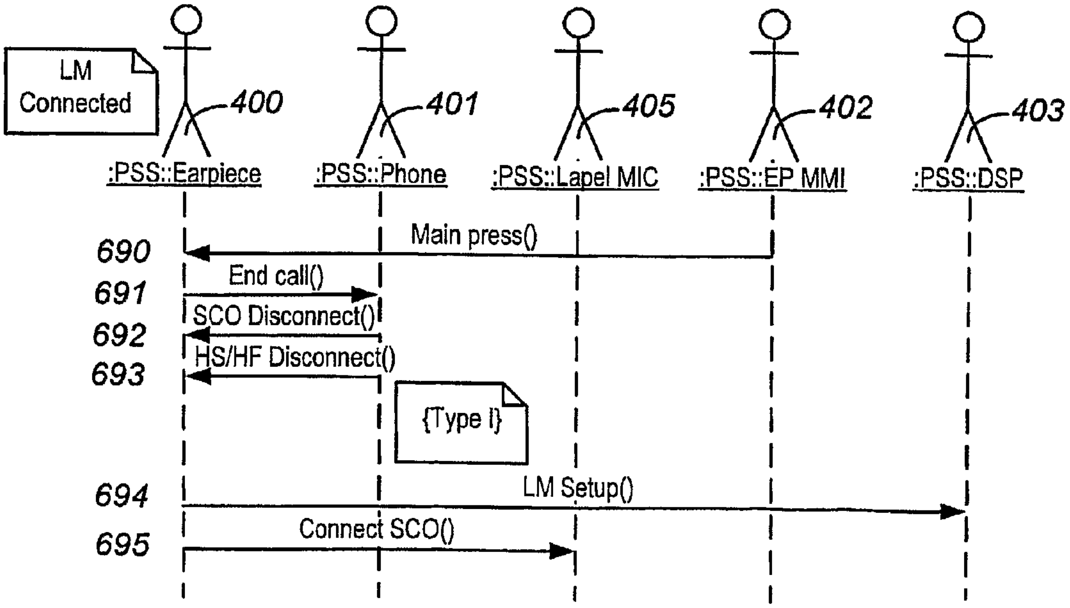
FIG. 28 illustrates a dynamic model for ending a call by the ear module on the multimode ear module.

FIG. 28 illustrates a dynamic model for the case in which the ear module is in the phone mode, and the ear module ends the call, also assuming that the companion microphone is connected. When the user presses the main button (690) during a call, the ear module issues an end call command to the phone (691). The phone then issues a audio channel disconnect command (692), and the HS or HF profile disconnect command as well if it is a type I phone (693). The ear module then performs the companion microphone set up process (694), and establishes the audio channel with the companion microphone (695).

Figure 29:
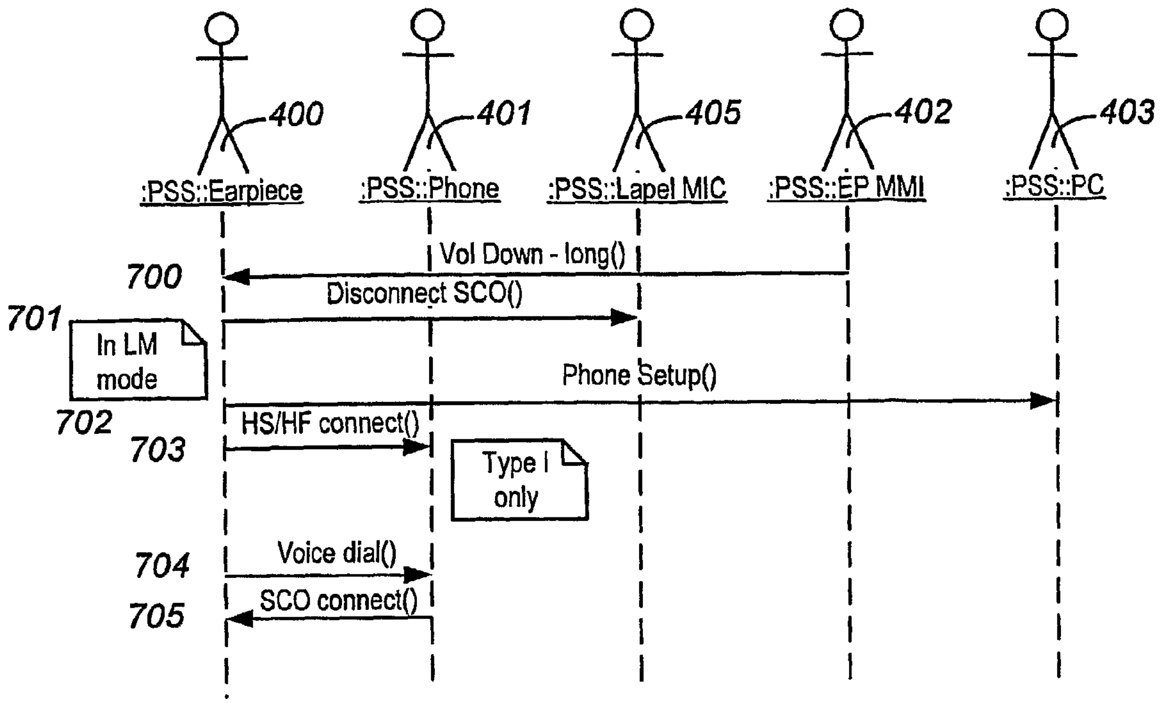
FIG. 29 illustrates a dynamic model for placing a voice call from the ear module.

FIG. 29 illustrates a dynamic model for the case in which the ear module is in the companion microphone mode, and the user indicates that a voice-activated call is to be made, assuming that the accompanying phone supports such call. When the user presses the input key, such as a volume down button for long interval (700), the ear module issues a command to the companion microphone to disconnect the audio channel (701). The ear module then performs a phone set up process (702), and requests, for a type I phone, connection for the HS or HF profile (703). The ear module then issues a voice dial command (704) according to the protocol required by the phone. The phone issues an audio channel connect command (705), and the call proceeds.

Figure 30:
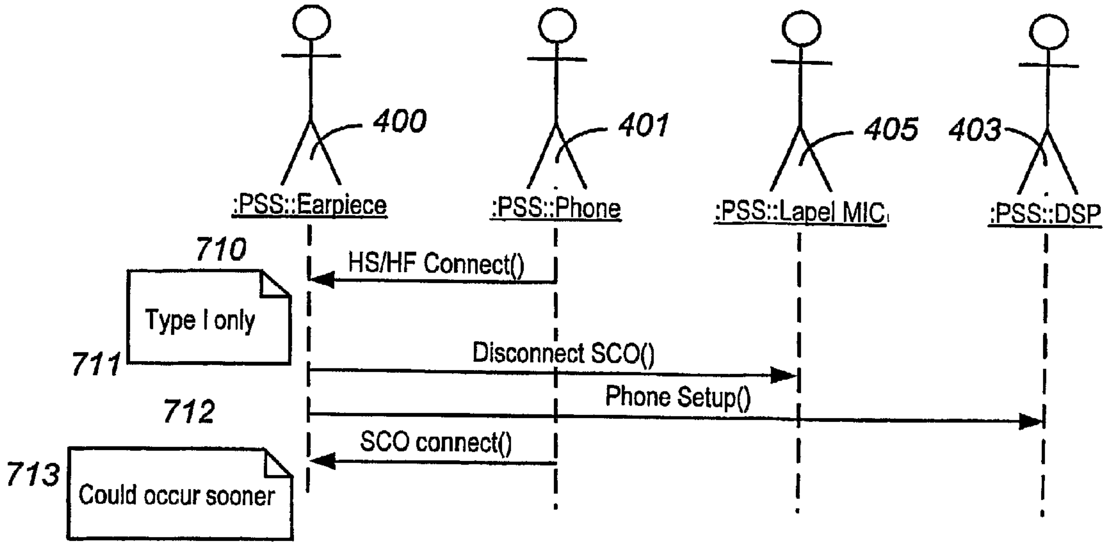
FIG. 30 illustrates a dynamic model for processing an outgoing call placed by the phone on the ear module.

FIG. 30 illustrates a dynamic model for the case in which a user places an outgoing call using a paired phone. In this case, the phone, assuming it is a type I phone, issues the appropriate profile connect signal (710). For the type II phone, the HS or HF profile channel is already connected. The ear module then disconnects the audio channel with the companion microphone (711), and performs a phone mode set up process (712). Upon connection of the call, the phone issues the audio channel connect command (713), and the call proceeds.

Figure 31:
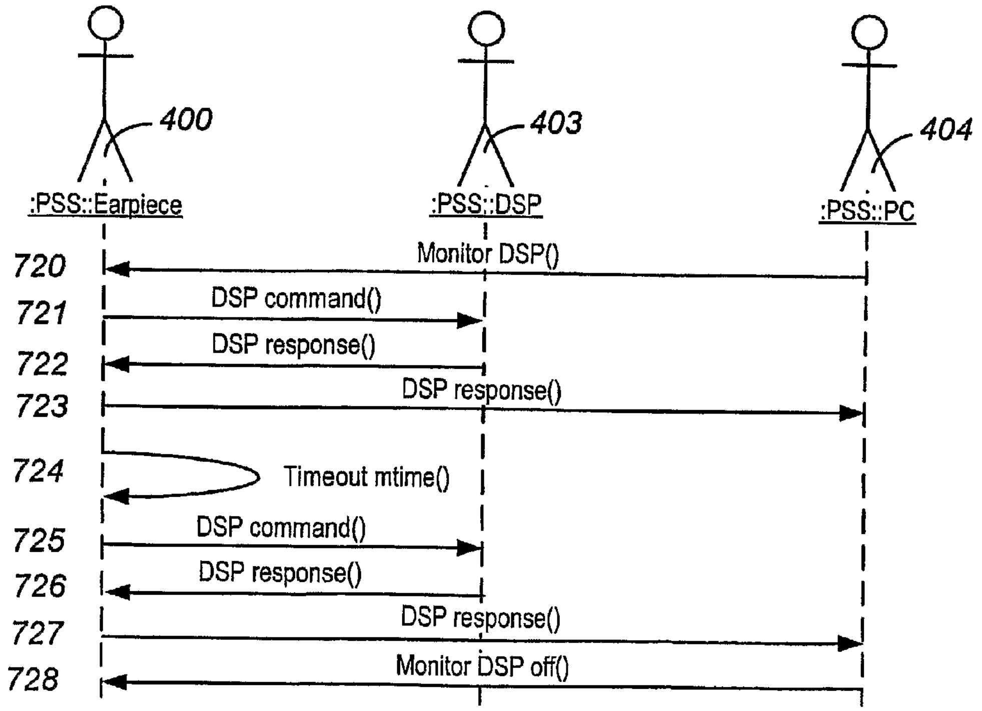
FIG. 31 illustrates a dynamic model for monitoring and control processing.

FIG. 31 is a dynamic model for monitoring and controlling functions between the ear module and the configuration host 404. The ear module supports connection from the companion host using the control channel at any time, and it uses the control channel to monitor functions of the ear module. In this figure, the configuration host issues a monitor DSP command (720), to monitor internal DSP values on the ear module. The ear module issues a command to the processing resources (721), and receives a response (722). The response is forwarded to the companion host (723). After some time (724), another command is issued by the ear module to the DSP processor (725) and a response is received (726). The response is then forwarded to the configuration host (727). Configuration host ends the session by sending a monitor DSP off command (728). Other interaction between the configuration host and ear module is possible as well, such as those interactions described above.

Figure 32:
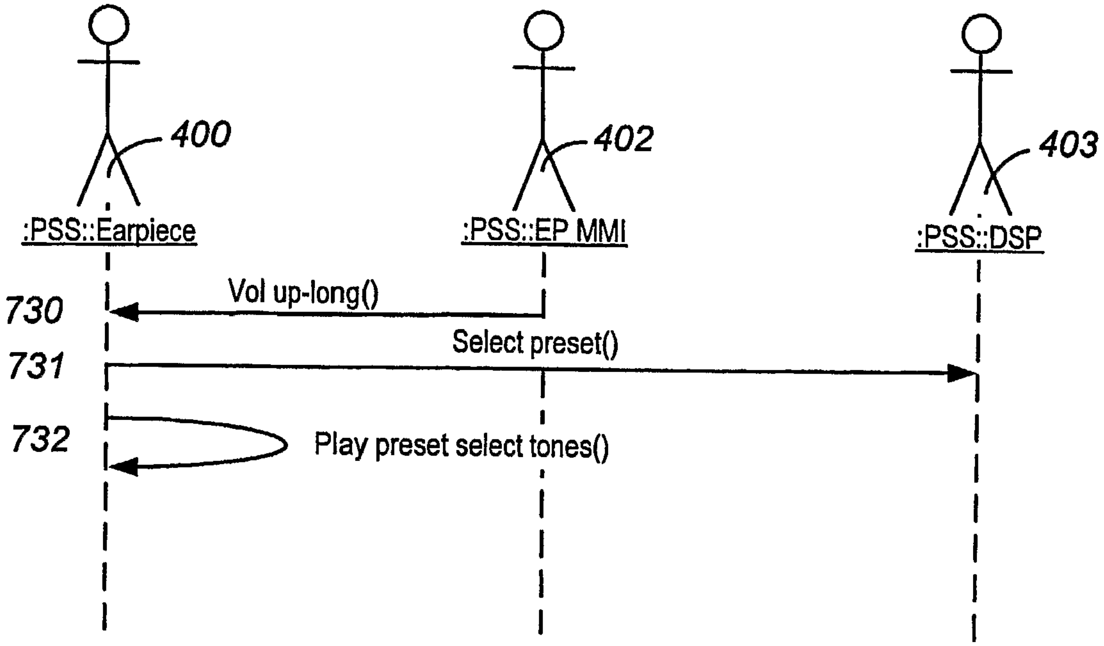
FIG. 32 illustrates a dynamic model for preset selection on the ear module.

FIG. 32 is a dynamic model for operation of the ear module for selecting a preset for use in a particular mode of operation. In any mode, the ear module user may change the preset selected by a pressing an input button, such as the volume up button, for a long interval (730). This results in issuing a selected preset command to the DSP resources (731) which increment the selected preset for the currently controlling mode. The ear module then plays a preset select tone (732), signaling successful changing of the preset.

Figure 33:
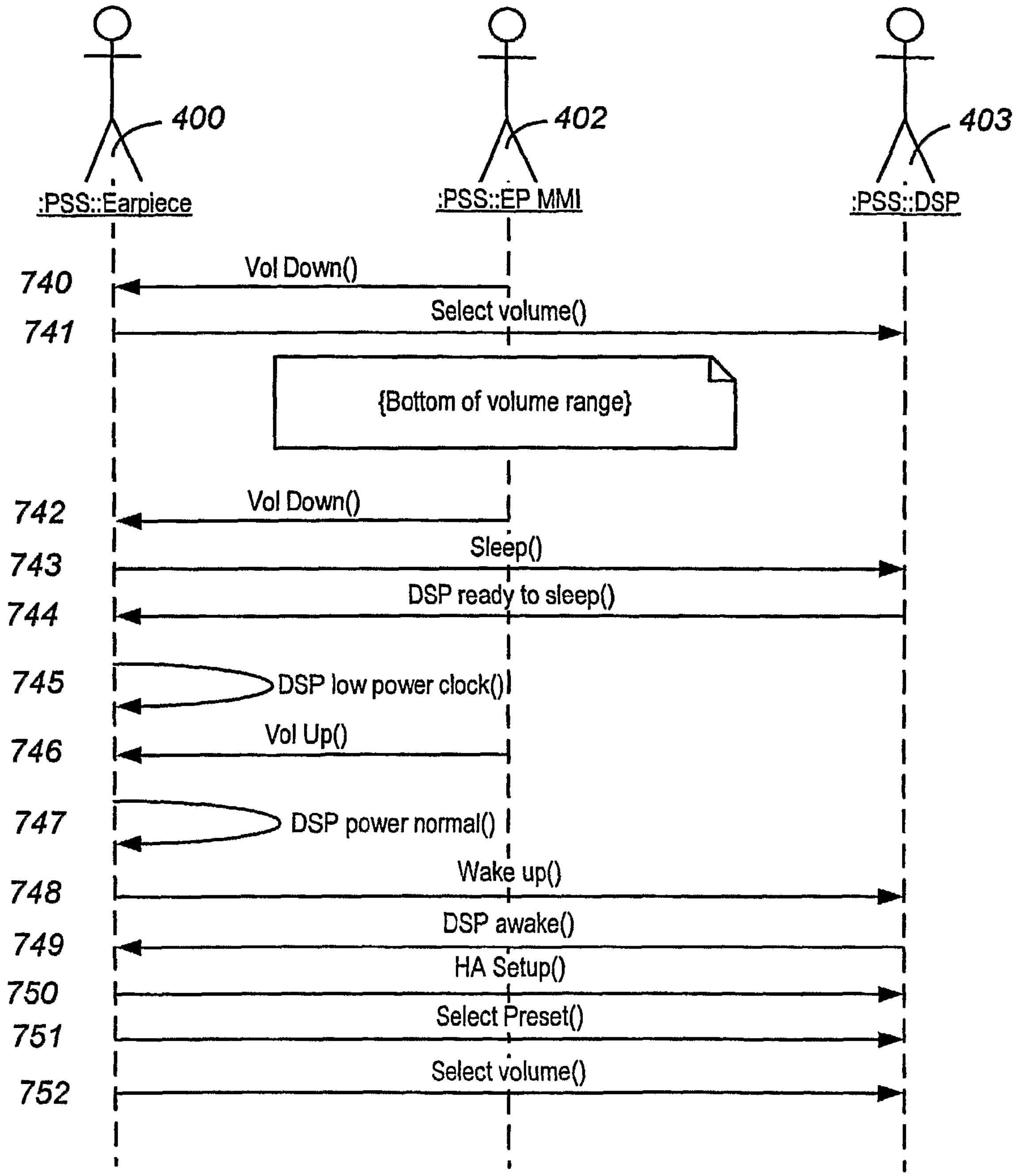
FIG. 33 illustrates a dynamic model for turning on and off the hearing aid mode on the ear module.

FIG. 33 is a dynamic model for operation of the ear module to turn on and off the hearing aid mode, while retaining the ability to take phone calls or to receive connections from the companion microphone. When this occurs, the ear module powers down the processing resources to save battery power. When reverting to the hearing aid mode, the DSP powers on and sets to the last-known settings for preset and volume. The user signals a power down of the hearing aid mode by pressing the volume down button (740) and the ear piece reduces the selected volume in response (741). When the system reaches the bottom of the volume range, and a volume down key remains pressed (742), then the ear module issues a sleep command to the processing resources (743). The processing resources issue a ready to sleep command (744) and enter a standby mode, with a low-power clock (745). To return to the hearing aid mode, the user presses a volume up button (746). The DSP clock is then returned to normal mode (747). A wake-up command is issued to the DSP resources (748), and a response is received back from the DSP when it is awake (749). A hearing aid mode setup process is executed (750). The preset is selected to the last used preset (751), and the volume is selected to the last used volume (752).

Figure 34:
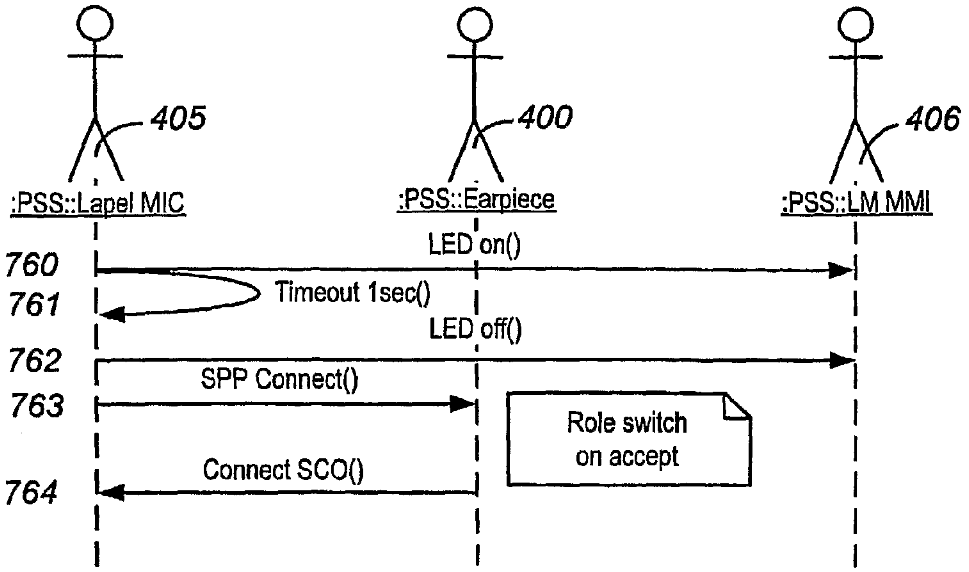
FIG. 34 illustrates a dynamic model for processing a power on event on the companion microphone.

FIG. 34 illustrates a dynamic model for processing on the companion microphone at a power on event. The user operates the buttons on the companion microphone power up device (not shown). The processor on the companion microphone turns on an LED on a module (760), and starts a one second timer (761). When the timer expires, the LED is turned off (762). The companion microphone then issues a control channel connected command to the ear module (763) using the private shared key established by the pre-pairing the operation. The ear module accepts the connection command, according to a priority scheme and, optionally, user input on the ear module, and performs a roll switch, in which it then requests a connection of an audio channel with the companion microphone (764). In embodiments of the technology described, the companion microphone is not enabled to initiate an audio channel connection with the ear module, allowing priority logic on the ear module itself to control the connection of all audio channels incoming to the device. The ear module is set up to always accept audio channel links from its paired devices in the illustrated embodiment.

Figure 35:
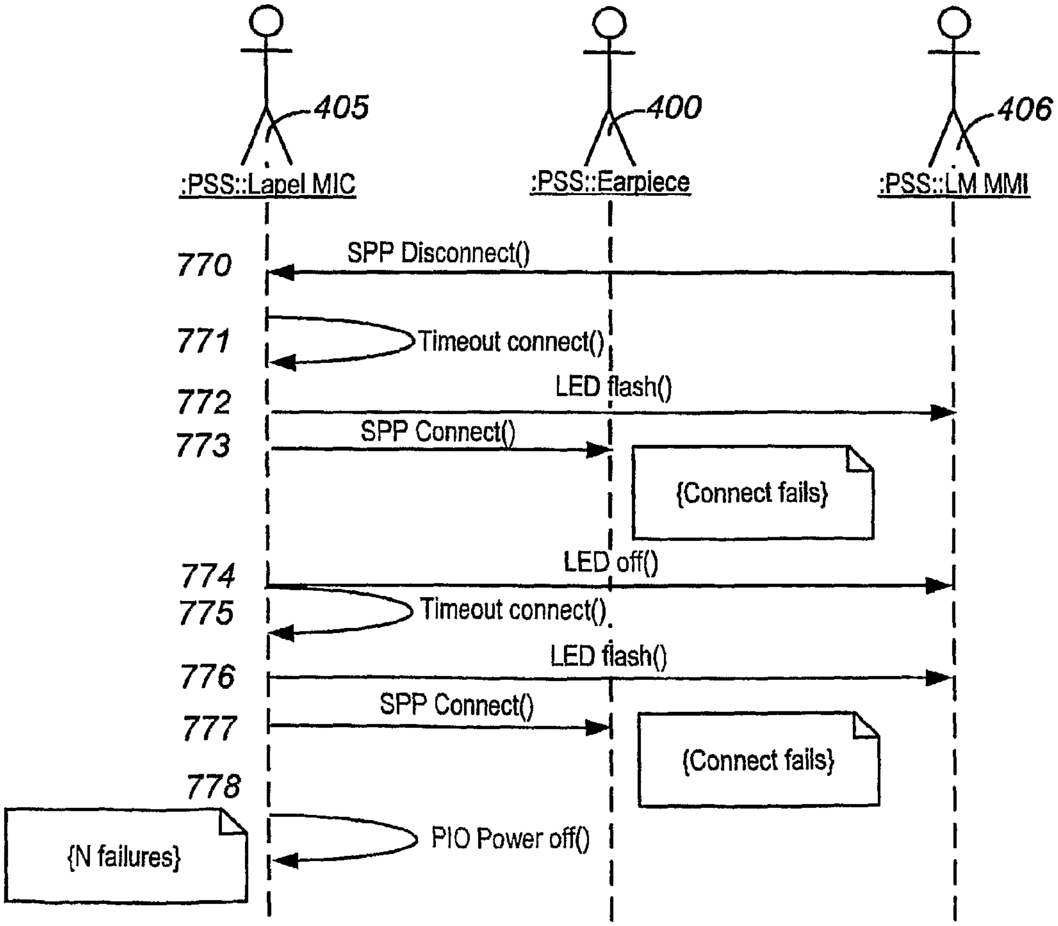
FIG. 35 illustrates a dynamic model for processing an out of range event on the companion microphone.

FIG. 35 illustrates a dynamic model for an out of range condition, or receipt of a control channel disconnect command, from the ear module on the companion module. When the companion module loses the control channel, or receives the control channel disconnect command (770), it starts a reconnect timer (771) and flashes an LED on the device (772). When the reconnect timer elapses, an attempt is made to reconnect the control channel (773). If the module remains out of range, then the companion module turns off the LED (774), and restarts the reconnect timer (775). When the reconnect timer elapses, the LED is turned back on (776), and an attempt is made to reconnect the control channel (777). This process is retried a maximum number of times, and if the maximum number of retries fails, then the device powers off (778). If the device comes back within range during the cycling, then it automatically reconnects with the ear module, and the retry timer is disabled.

Figure 36:
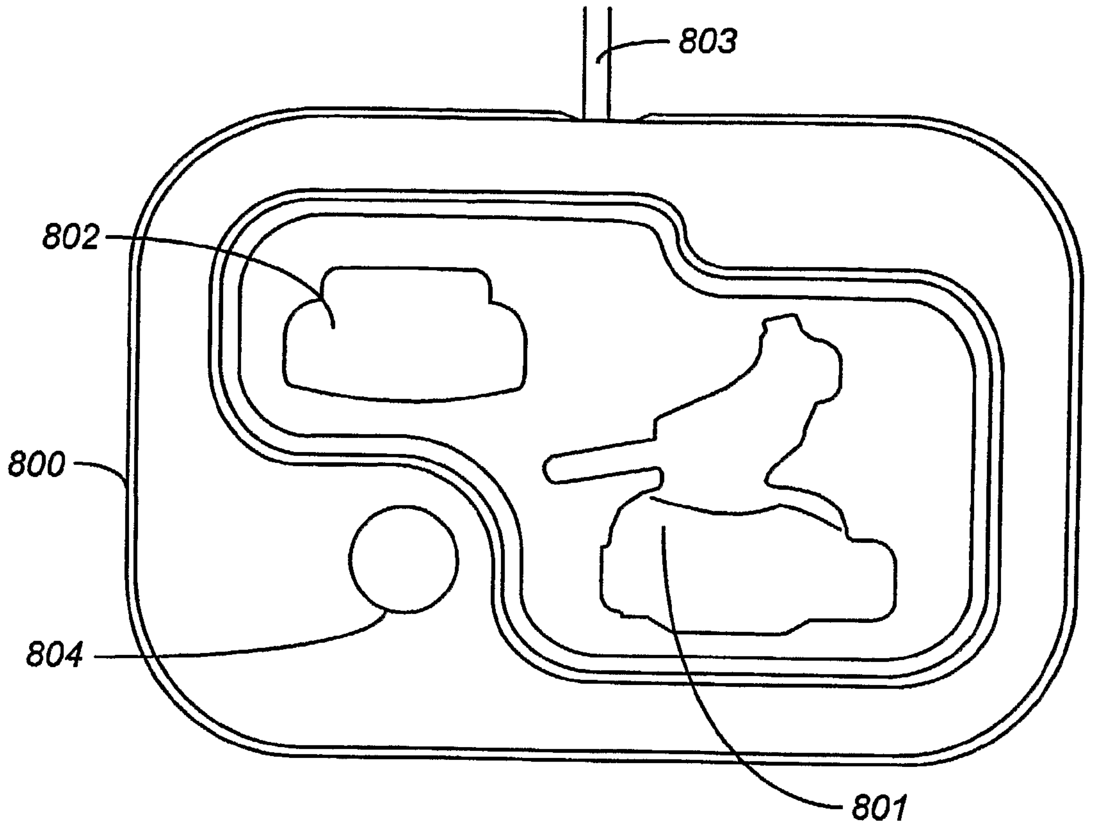
FIG. 36 illustrates a kit comprising an ear module, a companion microphone and a charging cradle.

FIG. 36 illustrates a kit comprising a recharging cradle 800, an ear module 801, and a companion microphone 802. Power cord 803 is coupled to appropriate power transformers and the like for recharging the ear module 801 and the companion microphone 802 at the same time. The recharging cradle 800 includes an indicator light 804. The recharging cradle includes appropriate connectors, and the ear module 801 and companion microphone 802 include appropriate mating connectors (not shown), for establishing the recharging current paths needed.

In embodiments of the invention sold as a kit, the companion microphone 802 and the ear module 801 are pre-paired prior to delivery to the customer. The pre-pairing includes storing in nonvolatile memory on the ear module a first link parameter used for establishing the communication links with phones or other rich platform devices capable of providing input of authentication parameters such as a configuration host, and a second link parameter, and other necessary network parameters such as device addresses and the like, used for communication links with the companion microphone 802. The pre-pairing also includes storing in nonvolatile memory on the companion microphone the second link parameter, and other necessary network parameters such as device addresses and the like, used for communication links with the ear module 801, and a third link parameter used for communication with rich platform devices capable of input of authentication parameters such as a configuration host. In this manner, a kit is provided in which the ear module 801 and a companion microphone 802 are able to communicate on a private audio channel without requiring configuration by a configuration host in the field before such communications.

A personal communication device is described in which a module including a radio includes a transmitter and a receiver which transmits and receives communication signals encoding audio signals, an audio transducer; a user input and control circuitry; and wherein the control circuitry includes logic for communication using the radio with a plurality of sources of audio data, memory storing a set of variables for processing audio data; logic operable in a plurality of signal processing modes, including a first signal processing mode for processing audio data from a corresponding audio source received using the radio using a first subset of said set of variables, and playing the processed audio data on the audio transducer, a second signal processing mode for processing audio data from another corresponding audio source received using the radio using a second subset of said set of variables, and playing the processed audio data on the audio transducer; and logic to control switching among the first and second signal processing modes according to predetermined priority in response to the user input and in response to signals from the plurality of sources of audio data.

A personal communication device is described such as that in paragraph [0144], wherein said logic to control switching causes the control circuitry to operate in the first signal processing mode by default, and causes switching to the second signal processing mode from the first signal processing mode in response to a request from the corresponding audio source.

A personal communication device is described such as that in paragraph [0144] in which said logic to control switching causes the control circuitry to operate in the first signal processing mode by default, and causes switching to the second signal processing mode from the first signal processing mode in response to a request from the corresponding audio source combined with an input signal from the user input.

A personal communication device is described such as that in paragraph [0144] which includes audio data in the memory, and logic to deliver audio data for an indicator sound from the memory to the audio transducer in response to a request received on the radio from one of the plurality of audio sources, and wherein said logic to control switching causes the control circuitry to operate in the first signal processing mode by default, and in response to a request from the corresponding audio source causes the indicator sound to be played on the audio transducer, and waits for an input signal from the user input, and in response to the input signal causes switching to the second signal processing mode from the first signal processing mode.

A method for configuring a personal sound system is described which includes a first module including a radio including a transmitter and a receiver adapted transmit and receive communication signals which encode audio signals, an audio transducer, and control circuitry for establishing a communication link using the radio based on a link parameter, and a companion module including a radio including a transmitter and a receiver adapted transmit communication signals encoding audio signals, a microphone and control circuitry for establishing a communication link using the radio based on the link parameter. The method includes using the configuration host computer to establish the link parameter for connecting the first module with the companion module; establishing a first radio communication link between the first module and the configuration host computer, and delivering the link parameter to the first module using the first radio communication link; and establishing a second radio communication link between the companion module and the configuration host computer, and delivering the link parameter to the companion module using the second radio communication link.

A method for configuring a personal sound system is described such as that in paragraph [0148] wherein said link parameter comprises an authentication parameter.

A method for configuring a personal sound system is described such as that in paragraph [0148], wherein said link parameter comprises a shared secret code used for an authentication protocol between the ear-level module and the companion module.

A method for configuring a personal sound system is described such as that in paragraph [0148], wherein said link parameter comprises an authentication parameter, the method further including using said first and second radio communication links for delivering a network address for the first module to the companion module, and delivering a network address for the companion module to the first module.

A method for configuring a personal sound system is described such as that in paragraph [0148], in which said first module includes logic for processing sound using a set of variables and playing the processed sound on the audio transducer; and includes using said first radio communication link, or another radio communication link, between the first module and the configuration host to deliver at least a subset of said set of variables to the first module.

A method for configuring a personal sound system is described such as that in paragraph [0148], in which said first module is adapted to be worn at ear-level, and includes logic for processing sound using a set of variables and playing the processed sound on the audio transducer; and includes determining at least a subset of said set of variables based on a hearing profile for a user; and using said first radio communication link, or another radio communication link, between the first module and the configuration host to deliver said subset of said set of variables to the first module.

A method for configuring a personal sound system is described such as that in paragraph [0148] in which said first module includes logic for processing sound using a set of variables and playing the processed sound on the audio transducer; and includes using an interactive program on the configuration host to determine modifications for said set of variables based on user feedback; and using said first radio communication link, or another radio communication link, between the first module and the configuration host to deliver said modifications of said set of variables to the first module.

A method for configuring a personal sound system is described such as that in paragraph [0154] in which said first module includes logic for plurality of signal processing modes, including a first signal processing mode for processing sound picked up by one of the one or more microphones using a first subset of said set of variables and playing the processed sound on the audio transducer, a second signal processing mode for processing audio data from the companion module received using the radio using a second subset of said set of variables, and playing the processed audio data on the audio transducer, a third signal processing mode for processing audio data from another audio source received using the radio using a third subset of said set of variables, and playing the processed audio data on the audio transducer; and wherein said interactive program determines modifications for at least two of the first, second and third subsets of said set of variables.

A method for configuring a personal sound system is described such as that in paragraph [0154] in which the first module includes a microphone, and said third signal processing mode processes audio data from a telephone, and includes processing sound picked up by the microphone to produce audio data from the one or more microphones, and transmitting audio data from the microphone to the telephone using the radio.

A personal communication device is described which comprises an ear-level module including a radio including a transmitter and a receiver which transmits and receives communication signals encoding audio signals, an audio transducer; one or more microphones, and control circuitry; wherein the control circuitry includes memory adapted to store first and second link parameters, and a set of variables; logic for communication with a configuration host using the radio, including resources for establishing a configuration channel with the configuration host and for retrieving said second link parameter from said configuration host and storing said second link parameter in said memory; logic for communication with a plurality of sources of audio data using the radio, including resources for establishing a first audio channel with the first link parameter, and a second audio channel with the second link parameter; logic operable in a plurality of signal processing modes, including a first signal processing mode for processing sound picked up by one of the one or more microphones using a first subset of said set of variables and playing the processed sound on the audio transducer, a second signal processing mode for processing audio data received using the first audio channel using a second subset of said set of variables, and playing the processed audio data on the audio transducer, a third signal processing mode for processing audio data received using the second audio channel using a third subset of said set of variables, and playing the processed audio data on the audio transducer; and logic to control switching among the first, second and third signal processing modes according to priority and in response to signals received on the first and second audio channels.

A personal communication device such as that described in paragraph [0157] which includes logic using the configuration channel to retrieve a network address for the companion module.

A personal communication device such as that described in paragraph [0157] which includes logic using the configuration channel to retrieve at least a subset of said set of variables.

A personal communication device such as that described in paragraph [0157] in which said third signal processing mode processes audio data from a telephone, and includes processing sound picked up by the one or more microphones to produce audio data from the one or more microphones, and transmitting audio data from the one or more microphones to the telephone using the radio.

A personal communication device such as that described in paragraph [0157] in which said logic for processing audio data includes resources for executing a plurality of variant signal processing algorithms, and said first subset of variables includes indicators to enable a first subset of said plurality of variant signal processing algorithms and said second subset of variables includes indicators to enable a second subset of said plurality of variant signal processing algorithms.

A personal communication device such as that described in paragraph [0157] in which said logic for processing audio data includes resources for executing a particular processing algorithm which is responsive to user specified parameters, and said first subset of variables includes a first user specified parameter for the particular processing algorithm and said second subset of variables includes a second user specified parameter for the particular processing algorithm, and wherein the first and second user specified parameters are different.

A personal communication device such as that described in paragraph [0157] in which said one or more microphones includes an omni-directional microphone.

A personal communication device such as that described in paragraph [0157] in which said one or more microphones includes an omni-directional microphone, and a directional microphone, adapted to pick up speech by a person wearing the ear-level module.

A personal communication device such as that described in paragraph [0157] in which said logic for communication using the radio includes a protocol driver for a wireless network.

A personal communication device such as that described in paragraph [0165] in which said wireless network is compatible with a standard Bluetooth network.

A personal communication device such as that described in paragraph [0157] which includes a user input device on the ear-level module adapted to provide control signals to the control circuitry.

A personal communication device such as that described in paragraph [0157] in which said set of variables includes at least one variable based on a hearing profile of a user.

A personal communication device such as that described in paragraph [0157] in which said set of variables includes at least one variable based on user preference related to hearing.

A device for delivering audio data is described, comprising a module including a radio including a transmitter and a receiver which transmits and receives communication signals, a microphone, and control circuitry; wherein the control circuitry includes memory adapted to store first and second link parameters; logic for communication with a configuration host using the radio, including resources for establishing a configuration channel using the first link parameter with the configuration host and for retrieving said second link parameter from said configuration host using the configuration channel; logic for communication with a destination for audio data using the radio, including resources for establishing an audio channel using the second link parameter; and logic transmitting audio data from the microphone using the audio channel to the destination.

A device for delivering audio data is described such as that in paragraph [0170] in which the first link parameter comprises an authentication code and the second link parameter comprises an authentication code.

A device for delivering audio data is described such as that in paragraph [0170] which includes logic using the configuration channel to retrieve a network address for the destination.

A personal communication system is described, comprising an ear-level module and a companion module; the ear level module including a radio, including a transmitter and a receiver, which transmits and receives communication signals encoding audio signals, an audio transducer, and control circuitry; wherein the control circuitry includes memory storing first and second link parameters; logic for communication with sources of data using the radio, including resources for participating in a first channel with the first link parameter, and for participating in a second channel with the second link parameter; and the companion module including a radio including a transmitter and a receiver which transmits and receives communication signals encoding audio signals, and control circuitry; wherein the control circuitry includes memory storing the second link parameter and a third link parameter; logic for communication with the ear-level module using the radio, including resources for participating in the second channel using the second link parameter; and logic for communication with another destination device using the radio, including resources for participating in a third channel using the third link parameter.

A system is described, such as that described in paragraph [0173], in which the ear level module and the companion module include rechargeable batteries, and include a recharging cradle adapted to hold both the ear level module and the companion module.

A personal communication device is described in which an ear-level module including a radio, including a transmitter and receiver, which transmits and receives communication signals encoding audio signals, an audio transducer; a microphone, an analog-to-digital converter providing samples of the sound picked up by the microphone at a first sample rate, a user input and control circuitry; wherein the control circuitry includes logic for participating in a communication channel using the radio with a source of audio data, wherein the communication channel encodes audio data having a second sample rate; and also includes signal processing logic operable in a first signal processing mode for processing sound picked up by one of the microphone and playing the processed sound on the audio transducer, and operable in a second signal processing mode for processing audio data from the source of audio data received using the radio, and playing the processed audio data on the audio transducer; and also includes logic to convert the audio data received using the radio having the second sample rate to the first sample rate for processing by said signal processing logic.

A device is described such as that in paragraph [0175] in which the signal processing logic in the second mode picks up sound from the microphone having the first sample rate, and the conversion logic converts the sound from the microphone to the second sample rate, and transmits the converted audio data on the communication channel using the radio.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A personal communication device comprising:

an ear-level module including a radio including a transmitter and a receiver which transmits and receives communication signals encoding audio data, an audio transducer; one or more microphones, a user input and control circuitry;

wherein the control circuitry includes logic for communication using the radio with a plurality of sources of audio data, memory storing a set of variables for processing audio data;

logic operable in a plurality of signal processing modes, including a first signal processing mode for processing sound picked up by one of the one or more microphones using a first subset of said set of variables and playing the processed sound on the audio transducer, a second signal processing mode for processing audio data from a corresponding audio source received using the radio using a second subset of said set of variables, and playing the processed audio data on the audio transducer, a third signal processing mode for processing audio data from another corresponding audio source received using the radio using a third subset of said set of variables, and playing the processed audio data on the audio transducer; and logic to control switching among the first, second and third signal processing modes according to predetermined priority in response to user input and in response to signals from the plurality of sources of audio data.

2. The device of claim 1, wherein said logic to control switching causes the control circuitry to operate in the first signal processing mode by default, causes switching to the second signal processing mode from the first signal processing mode in response to a request from the corresponding audio source, and causes switching from the second signal processing mode to the third signal processing mode in response to a request from the other corresponding audio source.

3. The device of claim 1, including audio data in the memory, and logic to deliver audio data to from the memory to the audio transducer in response to a request received on the radio from one of the plurality of audio sources.

4. The device of claim 1, including audio data in the memory, and logic to deliver audio data for an indicator sound from the memory to the audio transducer in response to a request received on the radio from one of the plurality of audio sources, and wherein said logic to control switching causes the control circuitry to operate in the first signal processing mode by default, and in response to a request from the corresponding audio source, said logic causes the indicator sound to be played on the audio transducer, and waits for an input signal from the user input, and in response to the input signal causes switching to the second signal processing mode from the first signal processing mode.

5. The device of claim 1, wherein said third signal processing mode processes audio data from a telephone, and includes processing sound picked up by the one or more microphones to produce audio data from the one or more microphones, and transmitting audio data from the one or more microphones to the telephone using the radio.

6. The device of claim 1, wherein said logic for processing audio data includes resources for executing a plurality of variant signal processing algorithms, and said first subset of variables includes indicators to enable a first subset of said plurality of variant signal processing algorithms and said second subset of variables includes indicators to enable a second subset of said plurality of variant signal processing algorithms.

7. The device of claim 1, wherein said logic for processing audio data includes resources for executing a particular processing algorithm which is responsive to parameters, and said first subset of variables includes a first parameter for the particular processing algorithm, and said second subset of variables includes a second parameter for the particular processing algorithm, and wherein the first and second parameters are different.

8. The device of claim 1, wherein the control circuitry includes logic using said radio for obtaining at least one variable from said set of variables from a remote source.

9. The device of claim 1, wherein said logic for maintaining communication using the radio with a plurality of sources of audio data includes a protocol driver for a wireless network linking the plurality of sources of audio data with the ear-level module.

10. The device of claim 1, wherein said set of variables includes parameters for a point-to-point communication channel linking the ear-level module with at least one of the plurality of sources of audio signals.

11. The device of claim 1, wherein said set of variables includes at least one variable based on a hearing profile of a user.

12. The device of claim 1, wherein said set of variables includes at least one variable based on user preference related to hearing.

13. The device of claim 1, wherein said set of variables includes at least one variable based on characteristics of audio sources in the plurality of audio sources.

14. A method of operating a personal communication device which comprises an ear-level module including a radio including a transmitter and a receiver which transmits and receives communication signals encoding audio data, an audio transducer; one or more microphones, a user input and control circuitry including logic for communication using the radio with a plurality of sources of audio data, memory storing a set of variables for processing audio data; the method comprising:

operating in a plurality of signal processing modes, including a first signal processing mode for processing sound picked up by one of the one or more microphones using a first subset of said set of variables and playing the processed sound on the audio transducer, a second signal processing mode for processing audio data from a corresponding audio source received using the radio using a second subset of said set of variables, and playing the processed audio data on the audio transducer, a third signal processing mode for processing audio data from another corresponding audio source received using the radio using a third subset of said set of variables, and playing the processed audio data on the audio transducer; and switching among the first, second and third signal processing modes according to predetermined priority in response to user input and in response to signals from the plurality of sources of audio data.

15. The method of claim 14, including operating in the first signal processing mode by default, switching to the second signal processing mode from the first signal processing mode in response to a request from the corresponding audio source, and switching from the second signal processing mode to the third signal processing mode in response to a request from the other corresponding audio source.

16. The method of claim 14, including delivering audio data for an indicator sound from the memory to the audio transducer in response to a request received on the radio from one of the plurality of audio sources, and operating in the first signal processing mode by default, and in response to a request from the corresponding audio source, said causing the indicator sound to be played on the audio transducer, and waiting for an input signal from the user input, and in response to the input signal, switching to the second signal processing mode from the first signal processing mode.

17. The method of claim 14, wherein said third signal processing mode processes audio data from a telephone, and including processing sound picked up by the one or more microphones to produce audio data from the one or more microphones, and transmitting audio data from the one or more microphones to the telephone using the radio.

18. The method of claim 14, wherein including executing a plurality of variant signal processing algorithms, and said first subset of variables includes indicators to enable a first subset of said plurality of variant signal processing algorithms and said second subset of variables includes indicators to enable a second subset of said plurality of variant signal processing algorithms.

19. The method of claim 14, including executing a particular processing algorithm which is responsive to parameters, and said first subset of variables includes a first parameter for the particular processing algorithm, and said second subset of variables includes a second parameter for the particular processing algorithm, and wherein the first and second parameters are different.

20. The method of claim 14, including using said radio for obtaining at least one variable from said set of variables from a remote source.

21. The method of claim 14, wherein said set of variables includes at least one variable based on a hearing profile of a user.

22. The method of claim 14, wherein said set of variables includes at least one variable based on user preference related to hearing.

23. The method of claim 14, wherein said set of variables includes at least one variable based on characteristics of audio sources in the plurality of audio sources.

24. A personal communication device comprising:

an ear-level module including a radio including a transmitter and a receiver which transmits and receives communication signals encoding audio data, an audio transducer; one or more microphones, and an user input;

means for operating in a plurality of signal processing modes, including a first signal processing mode for processing sound picked up by one of the one or more microphones using a first subset of said set of variables and playing the processed sound on the audio transducer, a second signal processing mode for processing audio data from a corresponding audio source received using the radio using a second subset of said set of variables, and playing the processed audio data on the audio transducer, a third signal processing mode for processing audio data from another corresponding audio source received using the radio using a third subset of said set of variables, and playing the processed audio data on the audio transducer; and means for switching among the first, second and third signal processing modes according to predetermined priority in response to user input and in response to signals from the plurality of sources of audio data.

25. A personal communication device comprising:

a module including a radio including a transmitter and a receiver which transmits and receives communication signals encoding audio signals, an audio transducer; a user input and control circuitry;

wherein the control circuitry includes logic for communication using the radio with a plurality of sources of audio data, memory storing a set of variables for processing audio data;

logic operable in a plurality of signal processing modes, including a first signal processing mode for processing audio data from a corresponding audio source received using the radio using a first subset of said set of variables, and playing the processed audio data on the audio transducer, a second signal processing mode for processing audio data from another corresponding audio source received using the radio using a second subset of said set of variables, and playing the processed audio data on the audio transducer; and logic to control switching among the first and second signal processing modes according to predetermined priority in response to the user input and in response to signals from the plurality of sources of audio data.

26. A personal communication device comprising:

an ear-level module including a radio including a transmitter and a receiver which transmits and receives communication signals encoding audio signals, an audio transducer; one or more microphones, and control circuitry;

wherein the control circuitry includes memory adapted to store first and second link parameters, and a set of variables;

logic for communication with a configuration host using the radio, including resources for establishing a configuration channel with the configuration host and for retrieving said second link parameter from said configuration host and storing said second link parameter in said memory;

logic for communication with a plurality of sources of audio data using the radio, including resources for establishing a first audio channel with the first link parameter, and a second audio channel with the second link parameter;

logic operable in a plurality of signal processing modes, including a first signal processing mode for processing sound picked up by one of the one or more microphones using a first subset of said set of variables and playing the processed sound on the audio transducer, a second signal processing mode for processing audio data received using the first audio channel using a second subset of said set of variables, and playing the processed audio data on the audio transducer, a third signal processing mode for processing audio data received using the second audio channel using a third subset of said set of variables, and playing the processed audio data on the audio transducer; and logic to control switching among the first, second and third signal processing modes according to priority and in response to signals received on the first and second audio channels.

* * * * *